(12) United States Patent
Zbranek et al.

(10) Patent No.: US 8,431,005 B1
(45) Date of Patent: Apr. 30, 2013

(54) PRODUCTION OF LITHIUM AND POTASSIUM COMPOUNDS

(75) Inventors: Vladimir Zbranek, Littleton, CO (US); Silvio Bertolli, Lakewood, CO (US); Pedro Vargas, Antofagasta (CL)

(73) Assignee: Western Lithium Corporation, Vancouver (CA)

( * ) Notice: Subject to any disclaimer, the term of this patent is extended or adjusted under 35 U.S.C. 154(b) by 0 days.

(21) Appl. No.: 13/168,930

(22) Filed: Jun. 24, 2011

Related U.S. Application Data

(60) Provisional application No. 61/358,324, filed on Jun. 24, 2010, provisional application No. 61/474,377, filed on Apr. 12, 2011.

(51) Int. Cl.
*C25B 1/16* (2006.01)
*C01B 31/24* (2006.01)

(52) U.S. Cl.
USPC ........................ 205/482; 205/496; 205/510

(58) Field of Classification Search ................ 205/482, 205/496, 510
See application file for complete search history.

(56) References Cited

U.S. PATENT DOCUMENTS

| | | |
|---|---|---|
| 1,936,070 A | 11/1933 | Ritchie et al. |
| 2,969,275 A | 1/1961 | Garrett |
| 3,111,383 A | 11/1963 | Garrett et al. |
| 3,479,294 A | 11/1969 | Weck |
| 3,675,773 A | 7/1972 | Chemtob et al. |
| 3,685,652 A | 8/1972 | Chemtob et al. |
| 4,036,713 A | 7/1977 | Brown |
| 4,215,100 A | 7/1980 | Sokolov et al. |
| 4,287,163 A | 9/1981 | Garrett et al. |
| 5,529,764 A | 6/1996 | Lampert et al. |
| 6,143,271 A * | 11/2000 | Holdengraber et al. ...... 423/552 |
| 2009/0104106 A1 | 4/2009 | Fairchild |

FOREIGN PATENT DOCUMENTS

| | | |
|---|---|---|
| JP | 61251511 A | 11/1986 |
| JP | 62161973 A | 7/1987 |
| JP | 62252315 A | 11/1987 |
| RU | 2090251 C1 | 9/1997 |

(Continued)

OTHER PUBLICATIONS

Scherzberg, H. et al., Messo pilots new potassium sulphate process, Mar.-Apr. 1992, Phosphorus & Pottasium No. 178, 8 pages.
Ryabstev, A.D. et al., Preparation of High-Purity Lithium Hydroxide Monohydrate from Technical-Grade Lithium Carbonate by Membrane Electrolysis, Russian Journal of Applied Chemistry, vol. 77, No. 7, 2004, pp. 1108-1116. Translated from Zhurnal Prikladnoi Khimii, vol. 77, No. 7, 2004, pp. 1123-1131.

(Continued)

*Primary Examiner* — Arun S Phasge
(74) *Attorney, Agent, or Firm* — Lathrop & Gage LLP

(57) ABSTRACT

This invention relates to the separation of lithium from lithium-containing materials, primarily ores such as hectoritic montmorillonite, having about 0.1 to 1.0 percent lithium by weight. The process comprises reducing the particle size of the material to less than about 150 microns; mixing the material with a solid source of sulfates and carbonates at predetermined ratios; granulating the mix with an aqueous solvent in order to obtain granules of 1-10 mm; reacting the granules at temperatures of 950-1100° C.; slurrying the reaction products with an aqueous solution; heating the resulting slurry at about 50° to 100° C. for from about 0.3 to 2 hr; separating the solids and evaporating the solution to separate potassium and sodium salts; separating the liquid portion of the cooled brine, which is treated with sodium carbonate, potassium carbonate with heating to remove interfering alkaline earth metals, cooling and separating the aqueous phase followed by treatment with sufficient alkali carbonate to precipitate the lithium carbonate with filtering of the hot slurry to remove the lithium as solid lithium carbonate.

9 Claims, 17 Drawing Sheets

FOREIGN PATENT DOCUMENTS

| | | |
|---|---|---|
| RU | 2196735 C1 | 1/2003 |
| WO | WO 9419280 A1 | 9/1994 |
| WO | WO 9929624 A1 | 6/1999 |

OTHER PUBLICATIONS

Grzmil, B.U. et al., Single-Stage Process for Manufacturing of Potassium Sulphate from Sodium Sulphate, Chem. Pap. 59(6b) 476-480 (2005).

Messo Technologies Group, Evaporation Technology brochure, 2003, 12 pages.

Leader Mining International; Binder No. 1; Project Summary for Production Feasibility Study for Cogburn Magnesium Plant, May 2003, 86 pages.

Messo-Chemietechnik, Mass Crystallization, 2003, 20 pages.

Wöhlk, W. et al., "Types of crystallizers," Int'l Chemical Engineering, vol. 27, No. 2, Apr. 1987, pp. 197-204.

Crocker, L., et al., "Lithium and its Recovery From Low-Grade Nevada Clays", USBM Bulletin 691, 1988, 43 pages.

* cited by examiner

PRODUCTION OF LITHIUM AND POTASSIUM COMPOUNDS

RELATED APPLICATIONS

This application claims the benefit of priority of U.S. Provisional Application No. 61/358,324 filed Jun. 24, 2010, and U.S. Provisional Application No. 61/474,377 filed Apr. 12, 2011. Each of these provisional applications are incorporated in its entirety into this application.

FIELD

Lithium and potassium are metallic elements. They combine with certain substituent groups to form compounds with unique and desirable properties. These compounds include lithium carbonate, lithium hydroxide and potassium sulfate. The field of this application is the field of extracting these and related compounds from mineral deposits and other naturally-occurring sources of useful chemicals.

BACKGROUND

The lithium market is divided into two distinct parts: lithium chemical and lithium mineral. Lithium produced as a chemical is used as a feedstock to produce other lithium compounds and metal. The vast range of final applications for lithium chemical include the manufacture of lithium batteries—primary and secondary—greases, glass and ceramics production, aluminum smelting, air quality control, catalysts, pharmaceuticals, polymers, cements, and alloys. As a mineral, lithium concentrates are used in the specialty glass and ceramics industry.

Recent estimates tentatively put the world consumption of lithium at close to 113,000 tonnes lithium carbonate equivalent (LCE) or 21,230 tonnes lithium metal in 2008. Details on total consumption and breakdown by end-use markets are seldom published because of the high degree of concentration within the lithium industry. The outlook for lithium consumption nonetheless appears optimistic with an overall growth rate of 5.8% predicted between 2008 and 2013. Demand for lithium carbonate, lithium hydroxide and lithium salts is projected to rise by 15% pa over the same period, from 3,940 t Li in 2008 to 7,720 t Li in 2013.

The mass production of plug-in hybrid and electric vehicles present the most significant upside potential for lithium demand in this end use. Estimates vary widely as to the market penetration these vehicles will achieve and as such lithium consumption could be significantly higher or lower than this 15% per year forecast. High fuel prices may force the industry toward formulating a "greener" environment, which in-turn could make lithium a strategic element causing an escalating growth in its demand.

SQM and Rockwood have both increased capacity at their operations in Chile and plan to increase further capacity in 2013. Capacity at the salt lakes in Tibet and China could also rise to 16,000 tonnes/year, although projects in both areas have had problems and capacity has thus far been underutilized and slow to ramp up. Several development projects are in various stages of planning worldwide, which may have an impact on the supply of lithium to the market.

The price for lithium chemicals and lithium minerals has consistently risen for the past several years. United States pricing for lithium carbonate ranges from $2.80-$3 per lb and $6,160-$6,600 per ton when sold as part of a large contract. There is no spot market for lithium and the price is negotiated on a contract basis.

Potassium chloride is the most popular potassium fertilizer, followed in a distant second place by potassium sulfate and then by potassium magnesium sulfate, potassium nitrate, potassium phosphate, and solutions of potassium thiosulfate and potassium polysulfide. The dominant use of potassium sulfate is as a source of the nutrients potassium and sulfur in high-value crops such as berries, citrus, spinach, lettuce, grapes, and tomatoes. It is also used to fertilize turf grass for golf courses and other landscaped and high-traffic grounds. potassium sulfate's industrial applications include the production of rubber, medicines, firebrick, and various construction materials.

More than 90% of the world's agricultural potassium requirements are supplied by potassium chloride, since it is a high-concentration fertilizer (60% K2O nutrient) that can be produced and supplied relatively cheaply per unit of K2O from a variety of sources. Global consumption of about 55 million tonnes of product has increased in response to growing populations and reduced arable land per capita requiring improved crop yield efficiencies. The remaining supply of nutrient potash is in the form of premium potash fertilizers, of which potassium sulfate is the predominate form, with relatively minor quantities of sulphate of potash magnesia and nitrate of potash being produced.

Statistics for potassium sulfate (containing approximately 50% K2O) consumption are uncertain since such a large percentage is accounted for by China, and even in the United States potassium sulfate may be folded in with statistics for potassium chloride. This market is estimated at 5 million tonnes worldwide. For the United States market, Great Salt Lake Minerals ("GLUM"), North America's leading producer of potassium sulfate from its solar evaporation facility at the Great Salt Lake in Utah, publishes details of its sales broken down into domestic and exports and reports United States Census Bureau numbers modified by the USGS. Based on these numbers (with the trade data presented in short tons), the annual apparent consumption peaked at more than 400,000 tons in 2005 and dropped to 329,000 tons in 2008 as higher prices reduced demand.

The United States regional breakdown of consumption is based on the size of the agricultural industry and the type of crops grown. In particular, California and Florida are important areas for cultivating fruit and vegetables and account for the bulk of potassium sulfate demand. Both states have a relatively high percentage of soil testing low to medium in potassium). More than 60% of United States fruit and nut production is in California, Oregon, and Washington, all state that use potassium sulfate. In addition, tobacco grown in the southeastern United States (North Carolina, Tennessee, Kentucky, and Virginia) is an important but declining consumer of potassium sulfate.

The world's potassium sulfate supply is derived from more than twenty producing companies, plus another 40 to 50 within China, each with an annual output ranging from less than 10,000 tonnes to more than 500,000 tonnes. Global capacity has grown to approximately 4.9 million tonnes/year, with the main producers being Asia (mainly China) (53%), Western Europe (29%), and North America (10%) followed by Latin America (4%, all Chile), the Former Soviet Union (3%), and the Middle East and Africa with less than 1% each. Based on the size of the market and the types of crops requiring potassium sulfate, the three most likely targets for potassium sulfate sales are: 1) California/Washington, 2) Florida and parts of the southeast coastline, and 3) the Kentucky/Tennessee region.

Statistics released by GSLM indicate that the average selling price of potassium sulfate FOB Ogden, Utah, for fiscal year (FY) 2002 and 2003 was about $210 per ton based on sales of about 250,000 tons. In FY 2004, prices increased to an average of $227 per ton as sales jumped more than 50% to 386,000 tons through GSLM's acquisition of IMC Global's customer base. GSLM purchased IMC's potassium sulfate capacity at Carlsbad, N. Mex., which it closed, but continued to service the customer base from its source in Utah. In 2005 and 2006, sales were steady and the average price increased to almost $260 and then to $292 per ton. In 2007, the volume of sales increased to 423,000 tons and the average price was almost $322 per ton. Although the volume sold fell to below 400,000 tons in 2008, the average selling price increased to almost $596 per ton. This increase in the selling price per ton is well illustrated in the quarterly results, which show an average price of $752 per ton for Q3 2008 and $975 per ton for Q4 2008. These price levels are supported by the average value of imports from Germany at $934 per ton in 2008. Other values based on significant quantities include Canada at $551 per ton.

A wide variety of processes have been developed to produce potassium sulfate and similar compounds. One example is the process practiced at the Arad facility in the Negev desert in Israel. Brine is taken from the Dead Sea and heated to high temperatures in a fluidized bed. The brine decomposes, releasing HCl among other compounds. The HCl is used to make hydrochloric acid. This in turn is reacted with mined phosphate rock to form potassium sulfate. See also U.S. Pat. No. 5,552,126 to Efriam et al. Potassium sulfate may be made directly from brines. One example is the process described in U.S. Pat. No. 3,977,835 to Chemtob et al. Readily processable salt groupings were selectively crystallized out of a complex salt brine from Sealres Lake containing potassium, sodium, chloride, sulfate, carbonate and borate ions by cooling the brine in at least one artificial cooling stage to a temperature sufficiently low to at least crystallize mirabilite, evaporating the brine in a first solar evaporator to crystallize out halite, or halite and burkeite, free of potassium salt values, and then further concentrating the brine in a second solar evaporator to obtain a grouping of salts rich in potassium values.

The brine contained potassium ion in an amount up to about 3% by weight, preferably from about 0.5% to about 2% by weight, carbonate ion in an amount of from about 2.5% to about 4.5% by weight, sulfate ion in an amount of from about 3.0% to about 6.0% by weight, and borate ion in an amount of from about 0.6% to about 1.2% by weight, all based on the total weight of the brine, with the balance of the ionic species present being sodium ion and chloride ion. This brine could be artificially cooled to temperatures as low as about −20° C. without crystallization of potassium salts.

After artificial cooling to at least 20° C. to crystallize at least mirabilite, the resultant brine was processed in a solar-evaporation stage to crystallize halite or a mixture of halite and burkeite, again, without crystallization of potassium salts. After solar evaporation to crystallize sodium salts, the brine was passed to another solar-evaporation stage where the potassium salts were deposited along with borax and sodium salts. Depending on the degree of artificial cooling, the relative amounts of glaserite and sylvite deposited varied. Sylvite was the most desired form and a high degree of artificial cooling was preferred. Selective salt group crystallization using cooling in combination with solar evaporation allowed a total harvesting of all salts contained in a complex brine.

A wide variety of processes have been developed to produce lithium carbonate and similar compositions. As with potassium sulfate, lithium carbonate has been recovered directly from brines. One such process is disclosed in U.S. Pat. No. 4,287,163 to Garrett et al., which involved use of soluble sulfate salts as salting-out agents to precipitate lithium sulfate monohydrate. Magnesium sulfate was a preferred salting-out agent. Other sulfate salts found useful as salting-out agents were sodium sulfate and sulfuric acid, including any of their hydrates (including magnesium hydrates) or partially dehydrated salts. Process solutions were concentrated in solar ponds.

Lithium carbonate and similar compositions also can be produced directly from ore that is rich in convertible lithium compounds. One example is the experimental process developed by the United States Bureau of Mines ("USBM") in 1988. *Lithium and Its Recovery from Low-grade Nevada Clays*, USBM Bulletin 691 (1988). USBM worked with clays obtained from the McDermitt Caldera in Nevada, which contained lithium in the form of hectorite.

The experimental USBM process is depicted in FIG. 1. To convert the hectorite-bound lithium to lithium carbonate, the clay was mixed with limestone and gypsum and the mix was subjected to feed preparation 101 followed by roasting 102. The clay was soft and friable and required no heavy crushing. However, it was air-dried and passed through a jaw crusher to produce a minus 10-mesh material before blending. The limestone and gypsum were treated similarly. Further feed preparation 101 entailed grinding and mixing the ingredients for 1 hour in a ball mill. The resultant mixture (80% finer than 200 mesh) was pelletized with water to produce nominal 6.5 mm diameter pellets. These pellets contained up to 20% moisture and were dried at 700° C. before roasting step 102.

Objectives of roasting step 102 were to (1) generate calcined material for leaching 103, purification, and product recovery studies, (2) determine optimum roasting conditions, and (3) determine typical gas emissions. Batch tests were conducted in the roaster to determine optimum retention time and roast temperature. Small charges (500 g) of pelletized 5:3:3 mix were roasted. The test results showed a 2 hour retention time and 9000 C to be optimum. This retention time was used throughout the roaster studies; the temperature was varied in a few tests in which the effect of temperature on lithium extraction was investigated.

To generate calcine for use in product-recovery solution studies an equivalent 5:3:3 mixture of clay, limestone, and gypsum was used; batch testing had established the 5:3:3 mix as optimum. The pelletized feed was charged to the roaster 102 in 600-g increments every 5 minutes to simulate continuous operation. Generally, each test produced 80 lb. of calcine in 6.5 hour operating time.

The final phase of the roast studies involved investigating the effects of charge composition and roast temperature on lithium extraction. A test series was conducted in which various mixes were roasted. Lithium extraction was determined by water-leaching 103 composite samples of the calcines. Lithium extractions of at least 80% were attained with a wide range of clay-limestone-gypsum ratios. Also, good lithium extraction was achieved over a temperature range of 850° C. to 975° C. The 5:2:2 mix was chosen for cost evaluation because this mix provided high extraction with a relatively low reagent addition. Emissions of $SO_2$ and fluorine were calculated from material balances. In a commercial operation, these off gases would require scrubbing before being vented to the atmosphere.

The objective of the leaching 103 tests was to determine the relationship between leach-system variables and optimal lithium extraction. The following variables were studied:
1. leach pulp percent solids,
2. wash water recycle,
3. calcine particle size, and
4. leach time.

The calcines leached in these leaching 103 tests were produced by roasting 5:3:3 mixtures of clay, limestone, and gypsum. Generally, 70 lb. of calcine was water-leached in each test. A slurry filter 104 recovered the leach solution. The filter cake from filter 104 was washed and discarded.

A series of 30-minute 103 leach tests was conducted at ambient temperature to study the effect of percent solids and wash water recycle on lithium extraction. The test results showed that the calcine was leached effectively at 40% solids with recycled wash water. At 50% solids, the lithium extraction decreased. Since the wash water was recycled to the leach step, the volume of wash water used was equal to the volume of makeup water required for the next leach.

The calcine pellets did not break apart during the leach step 103. USBM concluded that if a coarse particle could be leached effectively, grinding requirements would be minimized. A test series was conducted to study the effect of calcine particle size on lithium extraction. The calcine was leached for 30 minutes at 40% solids using recycled wash water. Test results showed that the 30-minute leach 103 extracted the lithium equally well from all particle sizes tested. To determine the effect of leach time on lithium extraction, a test series was conducted with coarse-crushed and whole pellets. The pellets were leached at 40% solids in recycled wash water.

Test results showed that lithium was extracted from coarse-crushed pellets with a 5-minute leach; whole pellets were not effectively leached in 5 minutes. Although the pellets did not break apart during the leach, prolonged agitation generated fines which affected filtration rates. Filtrate rates decreased with increased leach time and increased particle size. For 30-minute leaches, the whole pellet slurry filtered slowly because the filter cloth was blinded with fines. As the calcine particle size decreased, the fines tended to remain on top of the filter cake, allowing faster filtration. Overall, the test results indicate that coarse-grinding the calcine and 103 leaching it for 5 minutes at 40% solids provided good extraction and high filtration rates. Under these conditions, lithium extractions of 82 to 84% could be expected; the leach solution generally contained 2.5 to 3.0 g/l lithium.

USBM evaporator 105 was fed with leach solution and solution recycled from the previous test. The recycled solution—mother liquor plus product wash—accounted for about 20% of the total volume in evaporator 105. In addition to concentrating the solution, calcium as calcium carbonate was removed from the leach solution in this step of the process. The leach solution was saturated with calcium sulfate (about 0.6 g/l calcium ion). It was found that reducing the calcium ion concentration to about 0.015 g/l prevented calcium contamination of the product. The evaporation procedure involved the following steps:

1. The solution—leach plus recycle—was evaporated to about 50% of its original volume and then passed through filter 106 to remove calcium carbonate. Carbonate ion (approximately 15 g/l) present in the recycled solution precipitated over 99% of the calcium contained in the leach solution.

2. The filtrate was returned to evaporator 107. Evaporation continued until the solution was reduced to 20% of its original volume.

3. The hot concentrated solution, containing 12 to 13 g/l lithium, was transferred to the product precipitation step 108. Generally, this concentrated solution was cloudy because a small amount of lithium carbonate precipitated during evaporation.

Lithium recovery step 108 involved heating the concentrated solution to boiling and adding a stoichiometric amount of sodium carbonate to precipitate a lithium carbonate product. The objective of this step was to recover a product of at least 99% purity. Initially, the product was recovered from the hot solution by vacuum filtration and then dried. This procedure yielded a product of about 80% purity with the principal contaminants being sodium sulfate and potassium sulfate.

Numerous tests were conducted using leach solution to investigate product purification techniques. Test results were erratic because precise control of solution concentration was difficult and synthetic solutions were used to study operating variables. A series of laboratory tests was conducted using 1-liter batches of synthetic concentrated solution—made up with reagent chemicals—containing 97 g/l lithium sulfate, 158 g/l potassium sulfate, and 87 g/l sodium sulfate. Adding a stoichiometric amount of calcium carbonate to the hot solution precipitated lithium carbonate.

Product filtration and washing procedures were then studied. The following observations were made:

1. Pressure filtration 109 yielded a product of higher purity than vacuum filtration 109 by reducing the moisture content of the filter cake.

2. With pressure filtration 109, 4 to 6 liter of wash water per kilogram of dry product was required to produce a 99% pure product. A much higher volume of water was needed to produce a comparable product by vacuum filtration 109.

3. For pressure filtration 109, wash water volumes above 6 l/kg of dry product did not further improve product purity. Also, single-stage washing was as effective as either multi-stage washing or product reslurry.

4. Adding calcium carbonate as a saturated solution, rather than as a dry powder, had little effect on product purity. However, this procedure generated a coarse grainy product, in contrast to the fine powdery product obtained by adding dry calcium carbonate.

The wash water and product filtrate recovered in these tests contained 14 to 16 g/l of lithium carbonate. The wash was recycled to the evaporator. After a crystallization step, the mother liquor was also recycled.

In addition to residual lithium carbonate, the product filtrate from filter 109 contained high concentrations of potassium sulfate and sodium sulfate (over 150 g/l of each), preventing effective recycling. Tests showed that the most effective method for reducing the sulfate concentration involved crystallizing the salts in crystallizer 110 by chilling the product filtrate to between 0° and −4° C.; below −4° C. the filtrate froze. The mother liquor, which contained 70 g/l sodium sulfate and 100 g/l of potassium sulfate, was recovered by either vacuum or pressure filtration. Pressure filtration tended to reduce lithium loss by decreasing the amount of mother liquor present in the filter cake.

The filter cake was a mixture of glaserite and glauber salt Laboratory tests showed that glaserite and glauber salt could be recovered separately by a two-step crystallization procedure. At product filtrate temperatures down to about 17° C., the glaserite crystallized. The salt was recovered by vacuum filtration and analyzed as 33 wt % potassium, 8 wt % sodium, and <0.1 wt % lithium. Further cooling of the product filtrate (to as low as −4° C.) crystallized the glauber salt. The salt was recovered by pressure filtration and analyzed as 28 wt % sodium, 6 wt % potassium (a small amount of glaserite crystallized with the glauber salt), and 0.15 wt % lithium.

USBM roast-leach test results indicated 82% to 84% lithium extraction as optimum. Treating the leach solution by the methods specified resulted in 95% to 98% recovery of the contained lithium. Losses occurred in calcium carbonate filtration (0.5% loss) and in the crystallization step (2% to 5% loss, depending on the filtration method used to separate the mother liquor from the salts). Overall, 78 to 82% of the lithium contained in the clay was recovered as 99% pure lithium carbonate.

A material balance and a cost evaluation for a 5:3:3 ratio of clay-limestone-gypsum was prepared by USBM. The operating cost for this feed ratio was $2.12/1b lithium carbonate; this figure was revised to $2.27/lb. lithium carbonate as of May 1985. The cost evaluation showed raw materials (primarily limestone and gypsum) used in the process to be the most costly component. To lessen this expense, the evaluation recommended a reduction in the quantity of reagents used in the roast feed. The feed ratio could be reduced from 5:3:3 to 5:2:2 without affecting lithium extraction.

In May 1985, the USBM prepared a further cost evaluation. The evaluation estimated the operating cost of the process at $1.86/lb lithium carbonate produced. The evaluation was revised as of July 1987 and the updated operating cost was $2.02/lb lithium carbonate. The selling price of lithium carbonate as of July 1987 was $1.50/lb. As in the initial cost evaluation, a principal cost was the purchase of limestone and gypsum raw materials, which amounted to $0.39/lb. lithium carbonate. A high-cost section process section was evaporation, which, because of high fuel costs, added about $0.35/lb lithium carbonate produced. The capital cost was estimated to be about $105 million. No cost was allowed for land acquisition, mine development, and royalties on the ore. These costs would have to be considered before development of the resource could occur.

USBM concluded that for its process to be economical in the market of the time, the operating costs had to be reduced. The process unit operations that showed promise for cost reduction were identified as roasting 102, leaching 103, and evaporation 105/107. Limited rotary roaster testing was conducted to determine if the reagent requirement for the roast could be further reduced. The testing involved recycling lithium carbonate product filtrate and product wash water, without salt removal, to the roast step. Test results indicated that the salts in the recycled solution improved lithium recovery for the 5:1.5:1.5 feed ratio by about 1%; recovery for a 5:2:2 mix was improved by 3% to 5%.

In the USBM's proposed modification, the recycled solution would be used in pelletizing the roast feed; thus, the water requirements for feed preparation, as well as evaporation load, would be decreased. To reduce the capital costs associated with agitation leaching, percolation leaching was investigated. Tests were conducted using calcine from a 5:2:2 roast. The calcine was leached in a series of four acrylic columns measuring 4 inches in diameter by 4 feet high. Preliminary test results indicated that lithium extraction was comparable to that achieved using agitation leaching. The percolation leach solution contained about 7 g/l lithium; leach solution obtained by agitation leaching generally contained 2.5 g/l to 3 g/l lithium. This increase in solution loading could significantly reduce the evaporation load.

USBM believed that a cost-saving alternative for the evaporation step 105/107 would involve the use of solar evaporation. Although solar evaporation tests were not conducted, this modification was considered by USBM to be a viable alternative because of the hot, dry Nevada climate. The potential process modifications would all require expanded investigation to determine if they were viable alternatives to established procedures.

SUMMARY

A continuous process for simultaneously producing lithium carbonate and potassium sulfate from a mineral source of lithium and potassium compositions.

A continuous process for simultaneously producing lithium carbonate and potassium sulfate from a mineral source of lithium and potassium compositions in which lithium carbonate is extracted by crystallization.

A continuous process for simultaneously producing lithium hydroxide and potassium sulfate from a mineral source of lithium and potassium compositions.

A continuous process for simultaneously producing lithium hydroxide and potassium sulfate from a mineral source of lithium and potassium compositions. in which lithium hydroxide is extracted by membrane electrolysis.

A continuous process for simultaneously producing lithium carbonate, lithium hydroxide and potassium sulfate from a mineral source of lithium and potassium compositions.

A continuous process for simultaneously producing lithium carbonate, lithium hydroxide and potassium sulfate from a mineral source of lithium and potassium compositions in which lithium carbonate is extracted by crystallization.

A continuous process for simultaneously producing lithium carbonate, lithium hydroxide and potassium sulfate from a mineral source of lithium and potassium compositions in which lithium hydroxide is extracted by membrane electrolysis.

A continuous process for simultaneously producing lithium carbonate, lithium hydroxide and potassium sulfate from a mineral source of lithium and potassium compositions in which lithium carbonate is extracted by crystallization and lithium hydroxide is extracted by membrane electrolysis.

A method for recovering lithium, potassium and sodium from a material containing a low concentration of lithium, which method comprises:
 (a) reducing the material to small particles having average diameter of about 150 microns or finer;
 (b) mixing the material with a solid source of sulfates and carbonates at ratios 0.1:1 to 0.9:1
 (c) granulating the mix with an aqueous solvent in order to obtain granules of 1-10 mm
 (d) reacting the granules at temperatures of 950-1100 degrees C.
 (e) slurrying the reaction products of step (d) with process water;
 (f) heating the slurry of step (e) at about 50 degree. to 100 degree. C. for about between about 0.2 to 2 hr;
 (g) separating the solids and liquid of step (f);
 (h) evaporating the liquid of step (g) to a volume of about 30 to 50% of original and cooling to 0 degree to 35 degree C.;
 (i) treating the evaporate in (h) to remove glaserite by filtering the cool suspension
 (l) reacting of the liquid phase of step (i) with a sufficient aqueous alkali carbonate to precipitate lithium carbonate and heating to between about 60 degree. to 125 degree. C. for between about 0.5 and 10 hr;
 (m) separating the hot slurry of step (l) to recover the lithium value as solid lithium carbonate.
 (l) decomposing the glaserite of step (i) to produce solid potassium sulfate
 (n) reacting the liquid of step (m) with sufficient amount acid to remove carbonates
 (o) remove glauber salt by cooling crystallization
 (p) recovering of lithium hydroxide from mother liquor in step (i) by electrolysis.

DETAILED DESCRIPTION

Figure 1:
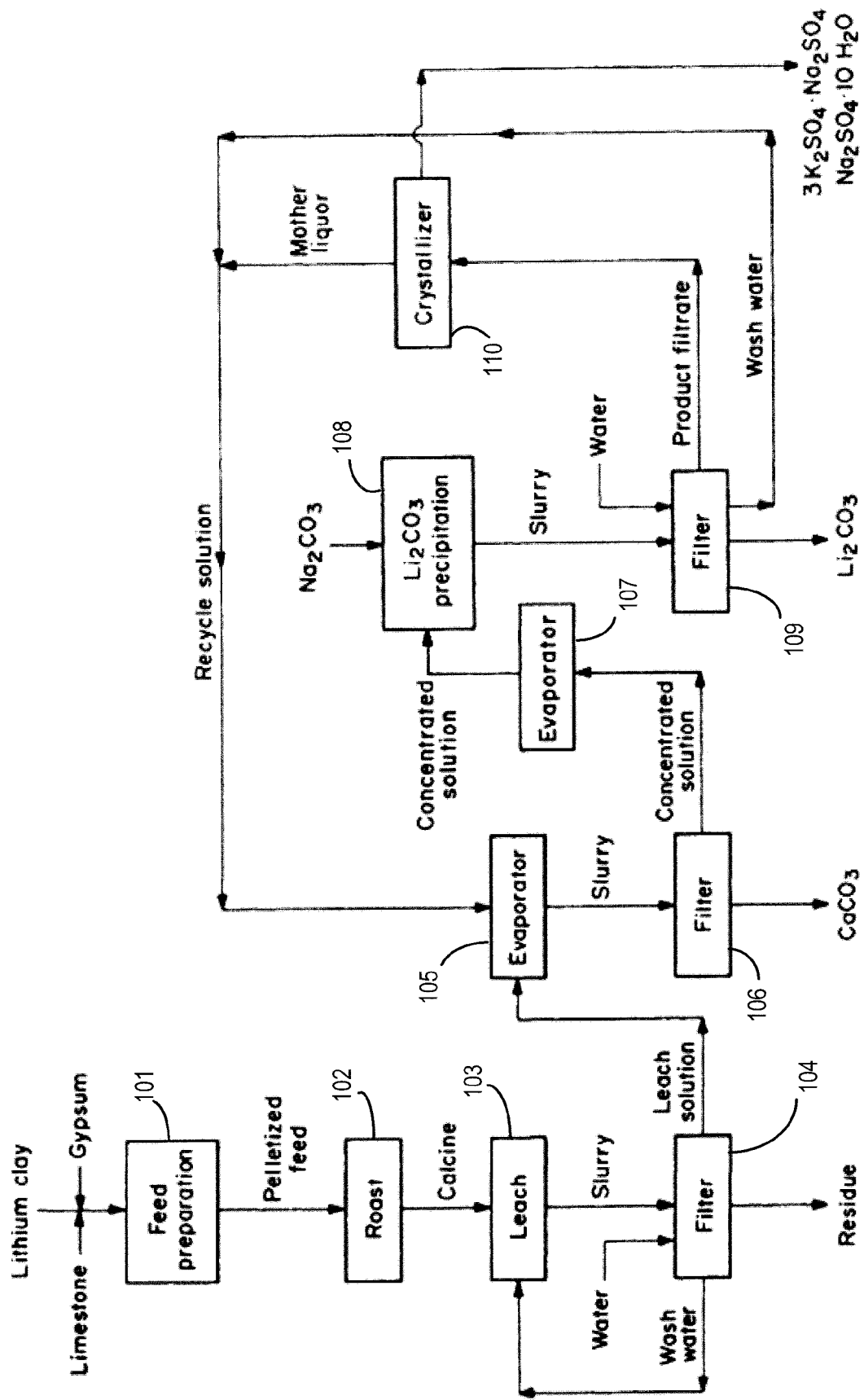
FIG. 1 is a schematic drawing of a prior-art process for producing lithium carbonate and potassium sulfate from a mineral source of lithium and potassium compositions (discussed in Background).
Figure 2:
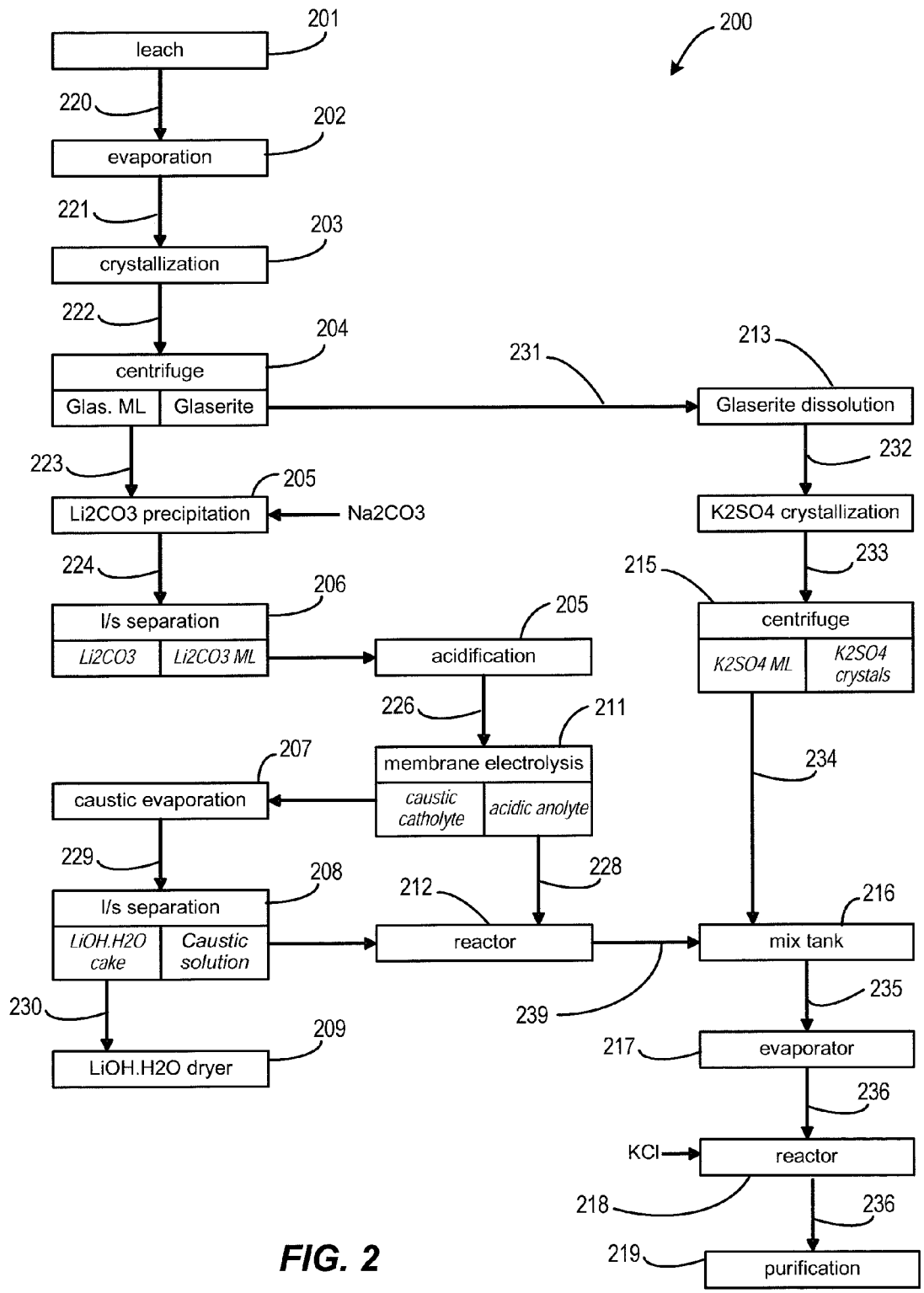
FIG. 2 is a schematic drawing of a continuous process for producing lithium carbonate, lithium hydroxide and potassium sulfate from a mineral source of lithium and potassium compositions in which lithium carbonate is extracted by crystallization and lithium hydroxide is extracted by membrane electrolysis.
Figure 9:
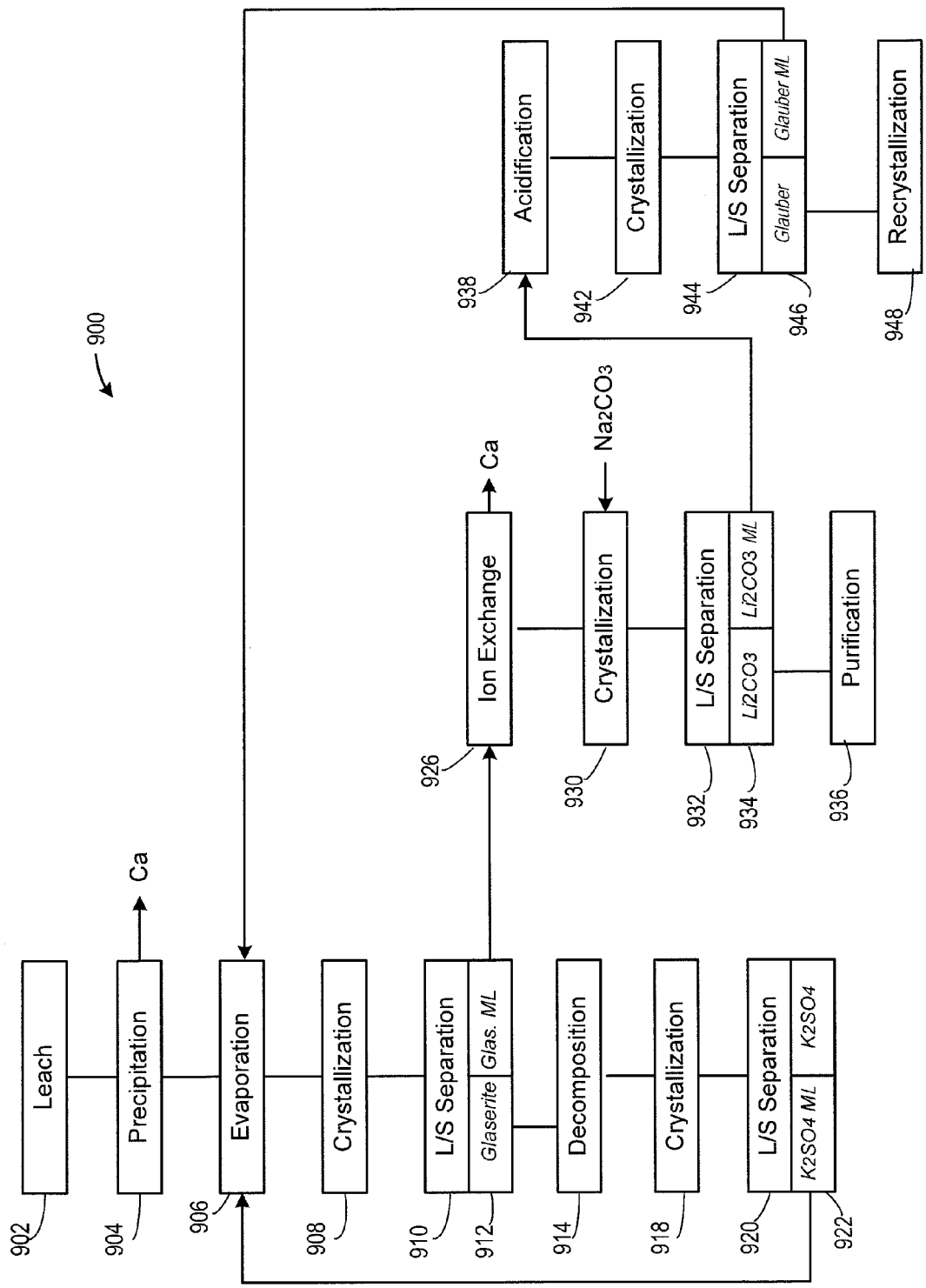
FIG. 9 is a schematic drawing of a continuous process for producing lithium carbonate and potassium sulfate from a mineral source of lithium and potassium compositions in which lithium carbonate is extracted by crystallization.

The physical and chemical processes employed in the inventions are sensitive to temperature. Certain preferred and highly preferred ranges (in oC) apply to various aspects of the processes of the inventions. Reference the following:

| Parameter | Example | Preferred | Most Preferred |
|---|---|---|---|
| leaching (20-65% solids) | FIG. 9 ref. 902 | 30 to 100 | 45 to 85 |
| evaporation | FIG. 9 ref. 906 | 50 to 110 | 65 to 95 |
| crystallization | FIG. 9 ref. 908 | −10 to 50 | −5 to 30 |
| crystallization | FIG. 9 ref. 918 | −15 to 25 | −10 to 15 |
| precipitation | FIG. 9 ref. 930 | 80 to 97 | 84 to 94 |
| crystallization | FIG. 9 ref. 942 | −5 to 15 | −4 to 10 |
| reaction | FIG. 2 ref. 218 | 5 to 40 | 10 to 30 |

EXAMPLE 1

FIG. 2 is a schematic drawing of a continuous process 200 for producing lithium carbonate, lithium hydroxide and potassium sulfate from a mineral source of lithium and potassium compositions in which lithium carbonate is extracted by crystallization and lithium hydroxide is extracted by membrane electrolysis. The mineral source is hectorite ore. Viewed broadly, the major process steps are ore size reduction, calcination, water leaching, lithium carbonate recovery, lithium hydroxide recovery and potassium sulfate recovery.

Ore Preparation

The ore is delivered from the mine by trucks and can be fed directly to the process or stored on the runoff-mine ore pad with capacity of 30 days of production. A front-end loader is provided for alternate means of ore delivery from ore pad to the process.

An impact crusher operating in a closed circuit with a vibrating screen reduces ore size to ~12 mm, suitable for the downstream grinding operation. The fine ore is conveyed to a stock pile providing surge capacity between the crushing operation on 10 hours per day schedule and the downstream continuous operation. The crushed ore is advanced to the process by reclaim feeders and conveyors. The downstream plant is designed to process 5000 tons per day of the ore.

Ore Calcining

The anhydrite and dolomite reagents required for the calcining process are crushed to ~12 mm size and stored in separate silos. In preparation for the calcining process, ore and the reagents are ground and well mixed to facilitate reactions. Reagents and ore are metered by weigh-belt feeders to a dry ball mill, operating in a closed circuit with cyclonic separator. The components are ground to ~150 micron and then are advanced to a pelletizer and dried in a fluid bed dryer, which is heated by a split stream of the hot off-gas from the downstream calciner. Dust generated in the ball mill and calciner circuits is collected in a baghouse filter and added to the pelletizer feed stream.

A step in this process is a conversion of lithium (and other alkali metals) contained in the ore to water-soluble sulfates employing a high temperature (1000° C.) calciner. The hectorite clay is mixed with dolomite and anhydrite minerals, which are necessary for the conversion process. The primary reaction is between lithium (and potassium, sodium) silicates present in the clay and calcium sulfate (anhydrite), forming alkali (lithium, potassium, sodium) sulfates and free silica ($SiO_2$). The presence of the dolomite prevents reverse reaction of alkali sulfates by bonding with free silica and forming calcium silicate. The advantage of this process is that the impurities in the ore remain insoluble, thus simplifying downstream recovery and refining. The reported reaction kinetics are slow, thus requiring an extended (1 hour) residence time.

The hot calcine is cooled by ambient air in a fluidized bed cooler. To increase the thermal efficiency of the system, preheated air from the cooler is used as make-up air for the calciner. To further maximize the thermal efficiency of the system, remaining calciner off-gas is used in the waste heat boiler to produce steam required in the downstream lithium and potassium sulfate recovery processes. The calcine material is stored in a bin to provide surge capacity between calcining and leach sections of the process.

Calcine Leaching

The calcine material is leached with water at 95° C. for 30 minutes. Operation at this elevated temperature maximizes concentration of potassium sulfate in solution, thus reducing energy costs in the downstream evaporation process. Lithium and potassium recoveries in the leach are 92% and 90% respectively.

The leach slurry is advanced to an automated filter press. Since the alkali sulfates are in the filtrate, the filter cake is washed and air-blown to maximize lithium and potassium recoveries and minimize the residual sulfate content of the tailings. Filtrate is stored in a holding tank, providing surge capacity between leach and downstream evaporation and crystallization processing. A polishing filter is provided on the filtrate stream to prevent any solid contaminant carryover to crystallizer 203.

The clarified leach filtrate contains traces of calcium. This can be removed in an ion exchange column located upstream of the evaporator 202. Calcium might contaminate the lithium carbonate product and foul up the membrane in the membrane electrolysis process.

Evaporation

Leach filtrate is fed as evaporator feed 220 to an evaporator 202 where brine concentration is increased to near-saturation. The composition of the feed 220 to the evaporator is as follows:

| Evaporator Feed 220 | |
|---|---|
| solids [tph] | 0.00 |
| liquid [tph] | 127.77 |
| total [tph] | 127.77 |
| total [m3/h] | 113.07 |
| sp.gr. | 1.13 |
| Li2CO3 [kg/h] | 0 |
| Li2SO4 [kg/h] | 5,176 |
| K2SO4 [kg/h] | 14,301 |
| Na2SO4 [kg/h] | 5,976 |
| Alk. Sulf. [kg/h] | 25,453 |
| water [tph] | 102.32 |
| Li [g/l] | 5.78 |

Evaporator 202 is operated at elevated temperature to maximize concentration of potassium sulfate. As an added benefit, lithium concentration is increased, thus reducing the lithium load in the recycle stream. The evaporator 202 is heated by steam generated in the waste heat boiler. Concentrated sulfate solution leaving evaporator 202 is collected in a pregnant liquor tank, providing surge capacity between evaporator 202 and crystallization process 203. The composition of the concentrated sulfate solution leaving evaporator 202 as evaporator product 221 is as follows:

| Evaporator Product 221 | |
|---|---|
| solids [tph] | 0.00 |
| liquid [tph] | 70.00 |
| total [tph] | 70.00 |
| total [m3/h] | 56.91 |
| sp.gr. | 1.23 |
| Li2CO3 [kg/h] | 0 |
| Li2SO4 [kg/h] | 5,176 |
| K2SO4 [kg/h] | 14,301 |
| Na2SO4 [kg/h] | 5,976 |
| Alk. Sulf. [kg/h] | 25,453 |
| water [tph] | 44.55 |
| Li [g/l] | 11.49 |

Glaserite Crystallization

An objective of the sulfate crystallization step 203 is to recover potassium sulfate as a marketable product and advance lithium to the lithium recovery step. The sulfate crystallization step 203 involves preparation of crystalline glaserite (3 $K_2SO_4 \cdot Na_2SO_4$) as an intermediate product, followed by crystallization and drying of potassium sulfate. The full composition of the product leaving crystallizer 203 as crystallizer product 222 is as follows:

| Crystallizer Product 222 | |
|---|---|
| solids [tph] | 13.18 |
| liquid [tph] | 56.82 |
| total [tph] | 70.00 |
| total [m3/h] | 56.91 |
| sp.gr. | 1.23 |
| Li2CO3 [kg/h] | 0 |
| Li2SO4 [kg/h] | 5,176 |
| K2SO4 [kg/h] | 14,301 |
| Na2SO4 [kg/h] | 5,976 |
| Alk. Sulf. [kg/h] | 25,453 |
| water [tph] | 31.37 |
| Li [g/l] | 11.49 |

Crystallizer product 222 is directed to centrifuge 204. The glaserite crystals are isolated and routed to a potassium sulfate recovery circuit. The composition of the glaserite product 231 is as follows

| Glaserite Crystals 231 | |
|---|---|
| solids [tph] | 13.18 |
| liquid [tph] | 0.69 |
| total [tph] | 13.88 |
| total [m3/h] | |
| sp.gr. | |
| Li2CO3 [kg/h] | 0 |
| Li2SO4 [kg/h] | 63 |
| K2SO4 [kg/h] | 9,868 |
| Na2SO4 [kg/h] | 2,681 |
| Alk. Sulf. [kg/h] | 12,612 |
| water [tph] | 0.38 |
| Li [g/l] | |

The glaserite mother liquor 223 that is generated by centrifuge 204 has the following composition:

| Glaserite ML 223 | |
|---|---|
| solids [tph] | 0.00 |
| liquid [tph] | 56.12 |
| total [tph] | 56.12 |
| total [m3/h] | 45.26 |
| sp. gr. | 1.24 |
| Li2CO3 [kg/h] | |
| Li2SO4 [kg/h] | 5,113 |

-continued

| Glaserite ML 223 | |
|---|---|
| K2SO4 [kg/h] | 4,433 |
| Na2SO4 [kg/h] | 3,295 |
| Alk. Sulf. [kg/h] | 12,841 |
| water [tph] | 30.98 |
| Li [g/l] | 14.27 |

Lithium Carbonate Recovery

Lithium carbonate is precipitated from the glaserite mother liquor 223 (containing mixed alkali sulfates) by addition of sodium carbonate, which is metered to lithium precipitation process 205. The lithium carbonate is soluble in water and more soluble in the glaserite mother liquor. Because this solubility decreases with an increase in temperature, precipitation is conducted at approximately 95° C. Precipitated lithium carbonate is separated from potassium and sodium sulfates in filter press 206, washed with hot water and dried. The composition of the lithium carbonate is as follows:

| Li2CO3 Crystals | |
|---|---|
| solids [tph] | 2.64 |
| liquid [tph] | 0.14 |
| total [tph] | 2.78 |
| total [m3/h] | |
| sp. gr. | |
| Li2CO3 [kg/h] | 2,637 |
| Li2SO4 [kg/h] | |
| K2SO4 [kg/h] | 0 |
| Na2SO4 [kg/h] | 0 |
| Alk. Sulf. [kg/h] | 0 |
| water [tph] | 0.14 |

Lithium Hydroxide Recovery

The sulfate-containing lithium mother liquor 225 from filter press 206 has the following composition:

| Li2CO3 ML 225 | |
|---|---|
| solids [tph] | 0.00 |
| liquid [tph] | 78.35 |
| total [tph] | 78.35 |
| total [m3/h] | 65.84 |
| sp. gr. | 1.19 |
| Li2CO3 [kg/h] | 801 |
| Li2SO4 [kg/h] | 0 |
| K2SO4 [kg/h] | 4,433 |
| Na2SO4 [kg/h] | 9,902 |
| Alk. Sulf. [kg/h] | 14,335 |
| water [tph] | 50.91 |
| Li [g/l] | |

This mother liquor 225 is acidified in acidification step 210 and then fed to membrane electrolysis process 211. The composition of this acidified mother liquor as the electrolysis feed 226 is as follows:

| Electrolysis Feed 226 | |
|---|---|
| solids [tph] | 0 |
| liquid [tph] | 106.10 |
| total [tph] | 106.10 |
| total [m3/h] | 86.26 |
| sp. gr. | 1.23 |

-continued

| Electrolysis Feed 226 | |
|---|---|
| Li2SO4 [tph] | 1,192 |
| K2SO4 [tph] | 4,433 |
| Na2SO4 [tph] | 9,902 |
| M2SO4 [tph] | 15,527 |
| water [tph] | 90.57 |

Membrane electrolysis process 211 converts alkali sulfates to their respective hydroxides on the cathode side to form a caustic catholyte 227, while sulfates are converted to sulfuric acid on the anode side to form an acidic anolyte 228. The electrolysis process generates very pure hydrogen and oxygen streams. Hydrogen can be used as supplemental fuel in calcining or marketed as a pure product.

The acidic anolyte 228 is in part recycled to acidification process 210 and in part fed to reactor 212 for further processing. The composition of the acidic anolyte 228 is as follows:

| Acidic Anolyte 228 | |
|---|---|
| solids [tph] | 0 |
| liquid [tph] | 270.16 |
| total [tph] | 270.16 |
| total [m3/h] | 259.77 |
| sp. gr. | 1.04 |
| Li2SO4 [kg/h] | |
| K2SO4 [kg/h] | |
| Na2SO4 [kg/h] | |
| H2SO4 [kg/h] | 10,390.61 |
| water [tph] | 259.77 |

The caustic catholyte 227 has the following composition:

| Caustic Catholyte 227 | |
|---|---|
| solids [tph] | 0 |
| liquid [tph] | 188.02 |
| total [tph] | 188.02 |
| total [m3/h] | 179.07 |
| sp. gr. | 1.05 |
| LiOH [kg/h] | 519 |
| KOH [kg/h] | 2,855 |
| NaOH [kg/h] | 5,579 |
| MOH [kg/h] | 8,953 |
| water [tph] | 179.07 |

The caustic catholyte is fed to evaporation process 207, where it is concentrated. The lithium hydroxide in the caustic catholyte has significantly lower solubility than either sodium hydroxide or potassium hydroxide. As a consequence, it crystallizes out in evaporation process 207 as lithium hydroxide mono-hydrate and drops out further when evaporator 207 output is cooled down prior to entering separator 208.

The lithium hydroxide is filtered and washed with a saturated aqueous solution of lithium hydroxide to remove entrained sodium and potassium. The washed product is dried and packaged under an inert atmosphere to avoid contact with carbon dioxide in air.

Potassium Sulfate Recovery

The liquor leaving separator 208 is a mixed-caustic solution 238 having the following composition:

| Mixed-Caustic Solution 238 | |
|---|---|
| solids [tph] | 0.00 |
| liquid [tph] | 33.76 |
| total [tph] | 33.76 |
| total [m3/h] | 22.50 |
| sp. gr. | 1.5 |
| LiOH [kg/h] | 5 |
| KOH [kg/h] | 2,855 |
| NaOH [kg/h] | 5,579 |
| MOH [kg/h] | 8,439 |
| MOH gpl] | 16,879 |
| water [tph] | 16.88 |

This mixed-caustic solution 238 is directed to reactor 212. There it reacts with the acidic anolyte 228 generated during membrane electrolysis 211 to form an alkali-sulfate solution 239 that is rich in potassium sulfate and sodium sulfate:

| Alkali-Sulfate Solution 239 | |
|---|---|
| solids [tph] | 0 |
| liquid [tph] | 267.85 |
| total [tph] | 267.85 |
| total [m3/h] | 255.10 |
| sp. gr. | 1.05 |
| Li2SO4 [kg/h] | 12 |
| K2SO4 [kg/h] | 4,433 |
| Na2SO4 [kg/h] | 9,902 |
| H2SO4 [tph] | 0 |
| water [tph] | 253.50 |
| Li [g/l] | |

The glaserite crystals 231 isolated in centrifuge 204 are subjected to glaserite dissolution process 213 to produce the following potassium-sulfate crystallizer feed 232 for crystallizer 214:

| K2SO4 Cryst. Feed 232 | |
|---|---|
| solids [tph] | 0.00 |
| liquid [tph] | 61.67 |
| total [tph] | 61.67 |
| total [m3/h] | 51.39 |
| sp. gr. | 1.2 |
| Li2CO3 [kg/h] | |
| Li2SO4 [kg/h] | 0 |
| K2SO4 [kg/h] | 9,868 |
| Na2SO4 [kg/h] | 2,681 |
| Alk. Sulf. [kg/h] | 12,549 |
| water [tph] | 49.12 |
| Li [g/l] | |

The crystallizer product 233 of crystallizer 214 has the following composition:

| Crystallizer Product 233 | |
|---|---|
| solids [tph] | 0.00 |
| liquid [tph] | 61.67 |
| total [tph] | 61.67 |
| total [m3/h] | 51.39 |
| sp. gr. | 1.2 |
| Li2CO3 [kg/h] | 0 |
| Li2SO4 [kg/h] | 0 |
| K2SO4 [kg/h] | 9,868 |
| Na2SO4 [kg/h] | 2,681 |

-continued

| Crystallizer Product 233 | |
|---|---|
| Alk. Sulf. [kg/h] | 12,549 |
| water [tph] | 49.12 |
| Li [g/l] | 0.00 |

The crystallizer product 233 of crystallizer 214 is separated into crystals and a mother liquor in centrifuge 213. The crystals, which represent potassium sulfate product, have the following composition:

| K2SO4 Crystals | |
|---|---|
| solids [tph] | 4.83 |
| liquid [tph] | 0.25 |
| total [tph] | 5.09 |
| total [m3/h] | |
| sp. gr. | |
| Li2CO3 [kg/h] | 0 |
| Li2SO4 [kg/h] | 0 |
| K2SO4 [kg/h] | 4,736 |
| Na2SO4 [kg/h] | 97 |
| Alk. Sulf. [kg/h] | 4,833 |
| water [tph] | 0.20 |
| Li [g/l] | |

The potassium-sulfate mother liquor 234 from centrifuge 213 has the following composition:

| K2SO4 Crystallizer ML 234 | |
|---|---|
| solids [tph] | 0.00 |
| liquid [tph] | 61.42 |
| total [tph] | 61.42 |
| total [m3/h] | 49.53 |
| sp. gr. | 1.24 |
| Li2CO3 [kg/h] | 0 |
| Li2SO4 [kg/h] | 0 |
| K2SO4 [kg/h] | 5,131 |
| Na2SO4 [kg/h] | 2,585 |
| Alk. Sulf. [kg/h] | 7,716 |
| water [tph] | 48.92 |
| Li [g/l] | 0.00 |

This potassium-sulfate mother liquor 234 is mixed with the output of reactor 212 in mixing process 216 to form a mixed-sulfate solution 235 having the following composition:

| Mixed-Sulfate Solution 234 | |
|---|---|
| solids [tph] | 0.00 |
| liquid [tph] | 324.49 |
| total [tph] | 324.49 |
| total [m3/h] | 304.68 |
| sp. gr. | 1.065 |
| Li2CO3 [kg/h] | 0 |
| Li2SO4 [kg/h] | 12 |
| K2SO4 [kg/h] | 9,565 |
| Na2SO4 [kg/h] | 12,487 |
| Alk. Sulf. [kg/h] | 22,063 |
| water [tph] | 302.42 |
| Li [g/l] | |

This mixed-sulfate solution 235 is concentrated in evaporator 217 to arrive at the following evaporator product 236:

| Evaporator Product | |
|---|---|
| solids [tph] | 8.82 |
| liquid [tph] | 74.49 |
| total [tph] | 74.49 |
| total [m3/h] | 57.30 |
| sp. gr. | 1.3 |
| Li2CO3 [kg/h] | 0 |
| Li2SO4 [kg/h] | 12 |
| K2SO4 [kg/h] | 9,565 |
| Na2SO4 [kg/h] | 12,487 |
| Alk. Sulf. [kg/h] | 22,063 |
| water [tph] | 52.42 |
| Li [g/l] | |

This evaporator product 236 is reacted with potassium chloride in reactor 218 to convert sodium sulfate into potassium sulfate, adding to the efficiency of the process overall in terms of recovery of potassium sulfate. The reactor output 237 is purified in purification step 219.

Figure 3:
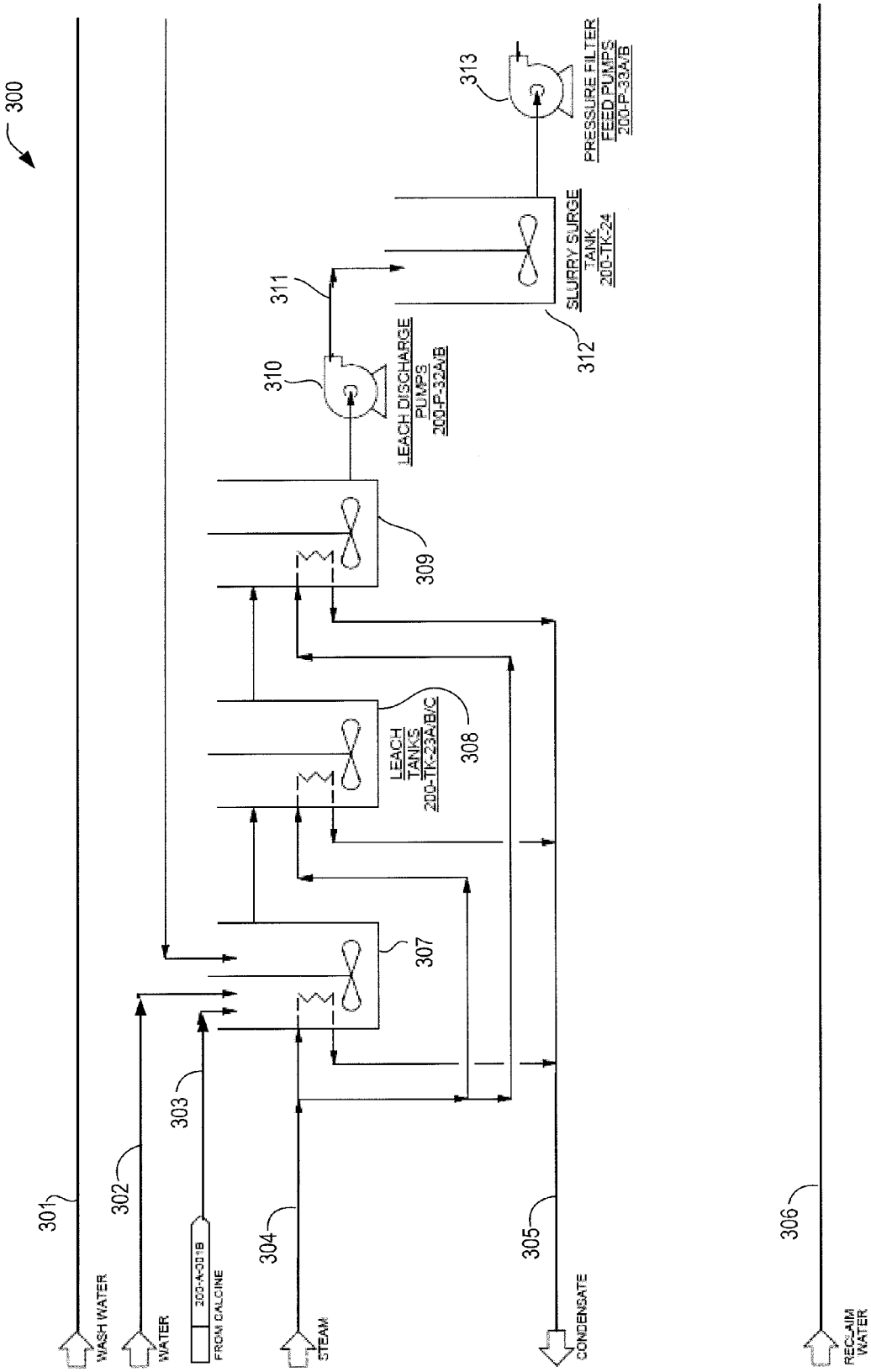
FIG. 3 is a detail drawing of a continuous process for purifying the leach liquor resulting from a continuous process for leaching lithium and potassium compositions from a calcined mineral source.
Figure 3:
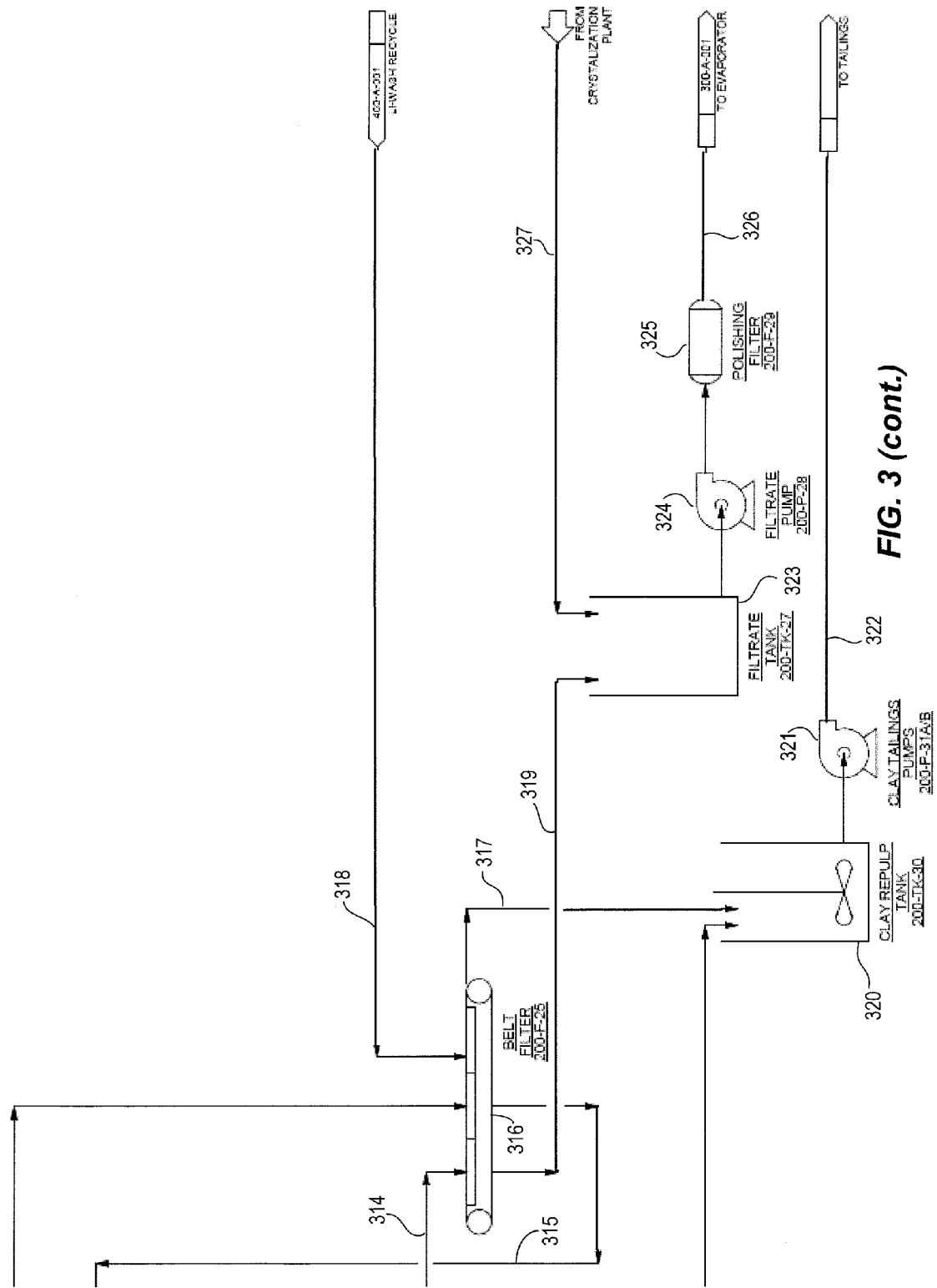

FIG. 3 is a detail drawing of a continuous process for purifying the leach liquor resulting from a continuous process for leaching lithium and potassium compositions from a calcined mineral source. Calcine leach feed 303 is deposited in leach tanks 308. Water is added. When leaching is complete, leach discharge pumps 310 convey the resulting slurry 311 to a slurry surge tank 312. When appropriate, pressure filter feed pumps 313 take filter feed 314 from slurry surge tank 312 and convey it to belt filter 316, which produces a filter cake 317 and a filtrate 319.

The filter cake 317 is conveyed to a clay repulp tank 320, where the filter cake 317 is agitated to form a clay 322, which is pumped from the clay repulp tank 320 by clay tailings pump 321. Filtrate 319 is conveyed to a filtrate tank 323. From there, it is pumped by a filtrate pump 324 through a polishing filter 325. The resulting leach filtrate 326 is conveyed to a downstream process evaporator.

The following table sets forth information about the various process streams shown on FIG. 3:

| | | Stream No. | | | | | | |
|---|---|---|---|---|---|---|---|---|
| | | 303 | 311 | 314 | 319 | 326 | 317 | 327 |
| | | Description | | | | | | |
| | | Calcine to leach | Slurry to Surge Tank | Filter Feed | Filtrate | Filtrate to Evap. | Filter Cake | Sulfate Mother Liquor |
| Solids | tph | 149.9 | 138.9 | 138.9 | 0.0 | 0.0 | 38.9 | 0.00 |
| Liquid | tph | 0.0 | 208.3 | 208.3 | 99.3 | 231.2 | 34.7 | 113.52 |
| TOTAL | tph | 149.9 | 347.1 | 347.1 | 99.3 | 231.2 | 173.6 | 113.52 |
| | m3/h | 100.0 | 252.7 | 252.7 | 80.8 | 204.6 | 86.1 | 100.5 |
| | % solids | 100.0 | 40.0 | 40.0 | 0.0 | 0.0 | 80.0 | 0.0 |
| | sp. gr. | 2.70 | 1.37 | 1.37 | 1.23 | 1.13 | 2.01 | 1.13 |
| Li | gpl, % | 0.418 | 0.415 | 0.415 | 7.00 | 4.85 | 0 | 1.41 |
| Li | kg/h | 627.1 | 576.9 | 576.9 | 565 | 1251 | 23 | 141 |
| K | gpl, % | 4.794 | .65 | 4.65 | 78.4 | 78.4 | 1.50 | 35.8 |
| K | kg/h | 7176 | 6458 | 6458 | 6329 | 10300 | 129.2 | 3599 |
| Na | kg/h | 2492 | 2243 | 2243 | 2198 | 5234 | 44.9 | 2885 |
| Temp. | deg. C | 60 | | | | | | |

Figure 4:
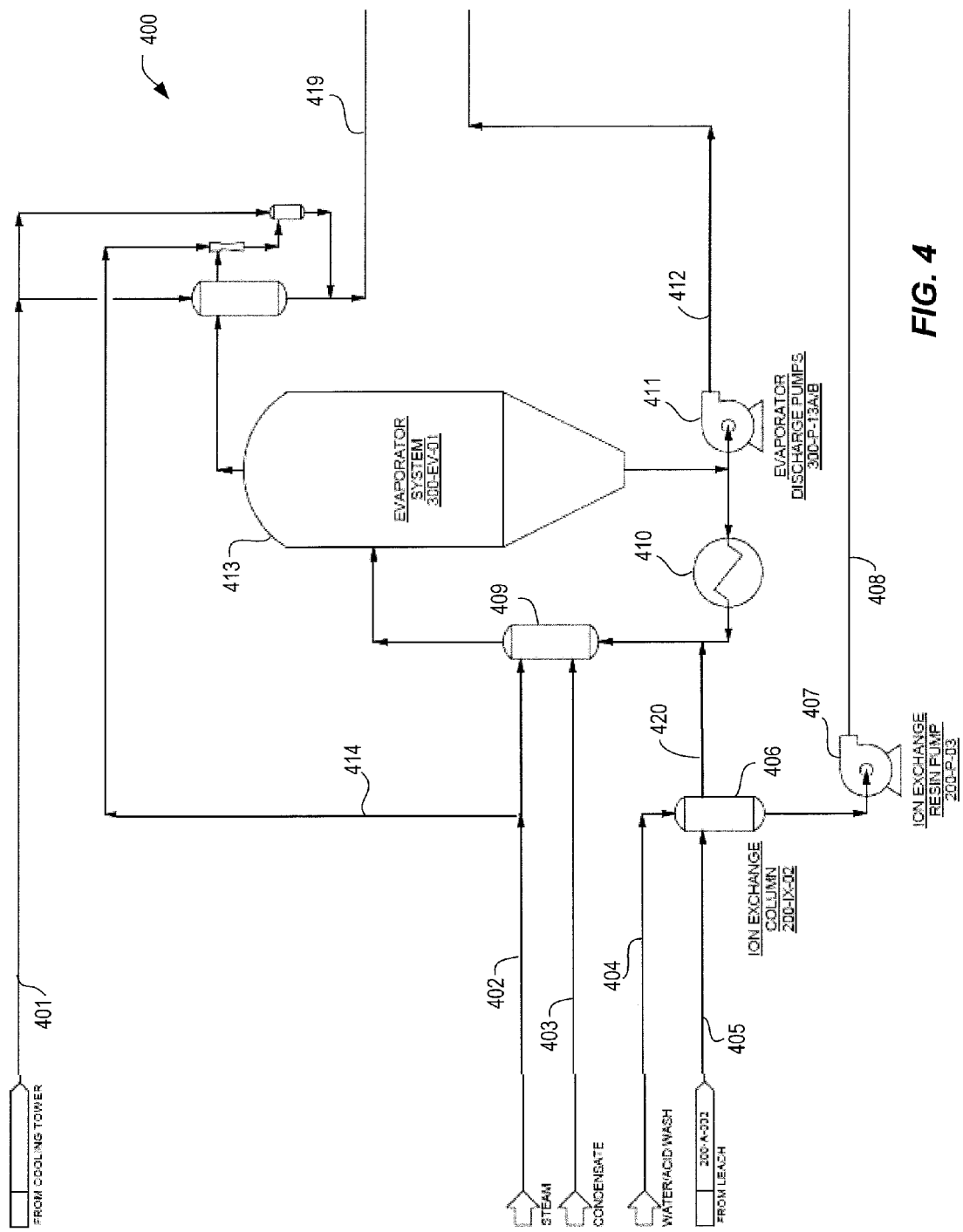
FIG. 4 is a detail drawing of a continuous process for concentrating the leach liquor resulting from a continuous process for leaching lithium and potassium compositions from a calcined mineral source.
Figure 4:
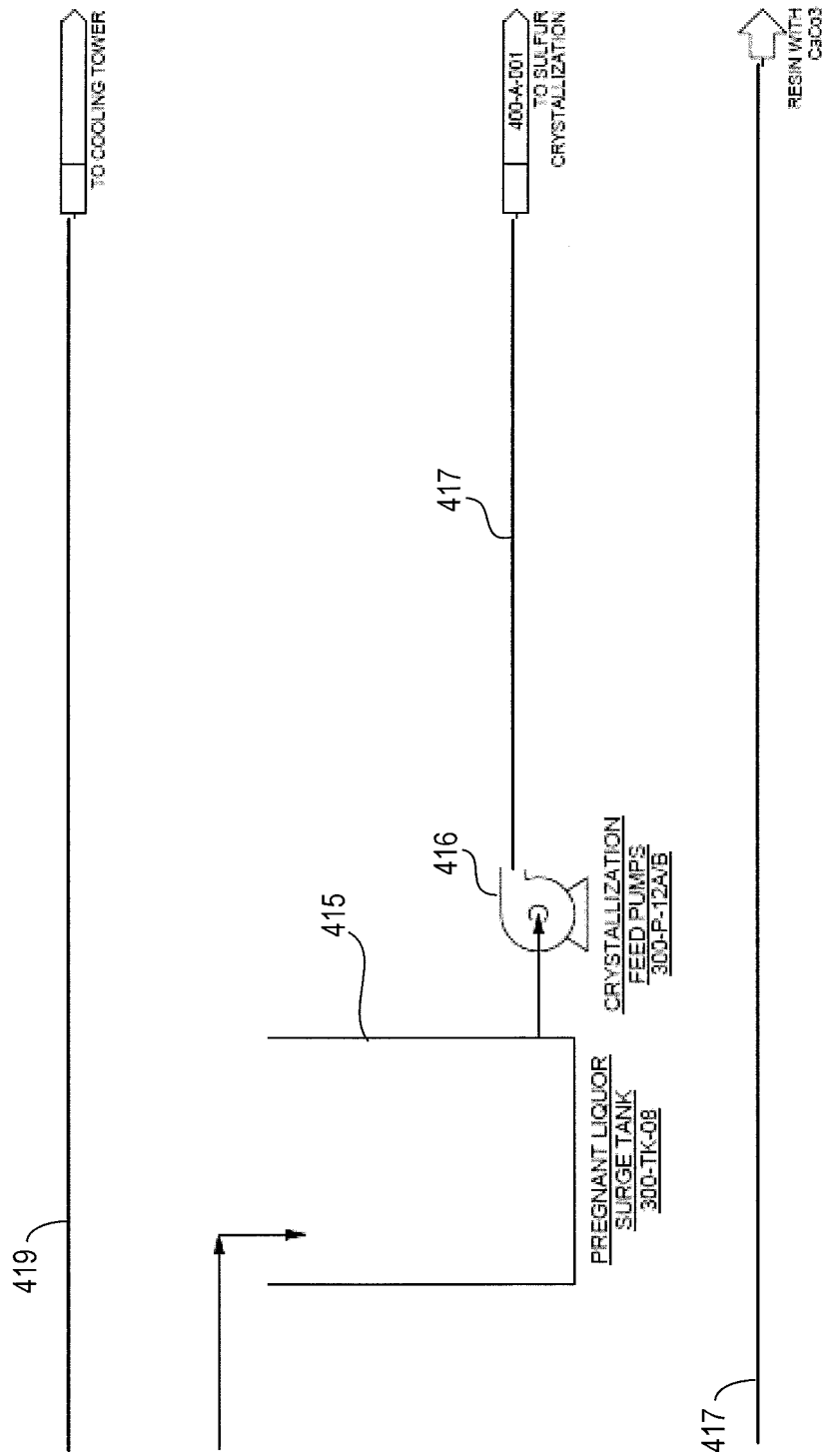

FIG. 4 is a detail drawing of a continuous process 400 for concentrating the leach liquor resulting from a continuous process for leaching lithium and potassium compositions from a calcined mineral source. Leach filtrate 405 is received from a process for purifying the leach liquor resulting from a continuous process for leaching lithium and potassium compositions from a calcined mineral source. Leach filtrate 405 is passed through ion exchange column 406 to remove calcium from solution. Cleaned filtrate 420 is heated in heat exchanger 409 and passed into evaporator 413.

After sufficient residence time, concentrate 412 is pumped from evaporator 413 into pregnant liquor surge tank 415 by evaporator discharge pumps 411. Crystallization feed pumps 416 pass concentrate from pregnant liquor surge tank 415 to downstream processes.

The following table sets forth information about the various process streams shown on FIG. 4:

| | | Stream No. | | | |
|---|---|---|---|---|---|
| | | 405 | 412 | 417 | 419 |
| | | Description | | | |
| | | Filtrate to Evap. | Evaporator Product | To Li Precip | Evaporator water to cooling tower |
| Solids | tph | 0.0 | 0.20 | 0.0 | 0.0 |
| Liquid | tph | 316.4 | 130.0 | 129.9 | 186.3 |
| TOTAL | tph | 316.4 | 130.2 | 129.9 | 186.3 |
| | m3/h | 280.0 | 104.99 | 104.8 | 186.3 |
| | % solids | | 0.15 | 0.0 | 0.0 |
| | sp. gr. | 1.13 | 1.24 | 1.2 | 1.00 |
| Li | gpl, % | 4.85 | 13.5 | 7.1 | 0 |
| Li | kg/h | 1251 | 1416.7 | 747.2 | 0 |
| K | gpl, % | 39.1 | 98.1 | 96.9 | 0 |
| K | kg/h | 10300 | 10300 | 10159 | 0 |
| Na | kg/h | 5234 | 5234 | 5170 | 0 |
| Temp. | deg. C. | 20 | | | 0 |

EXAMPLE 2

Figure 5:
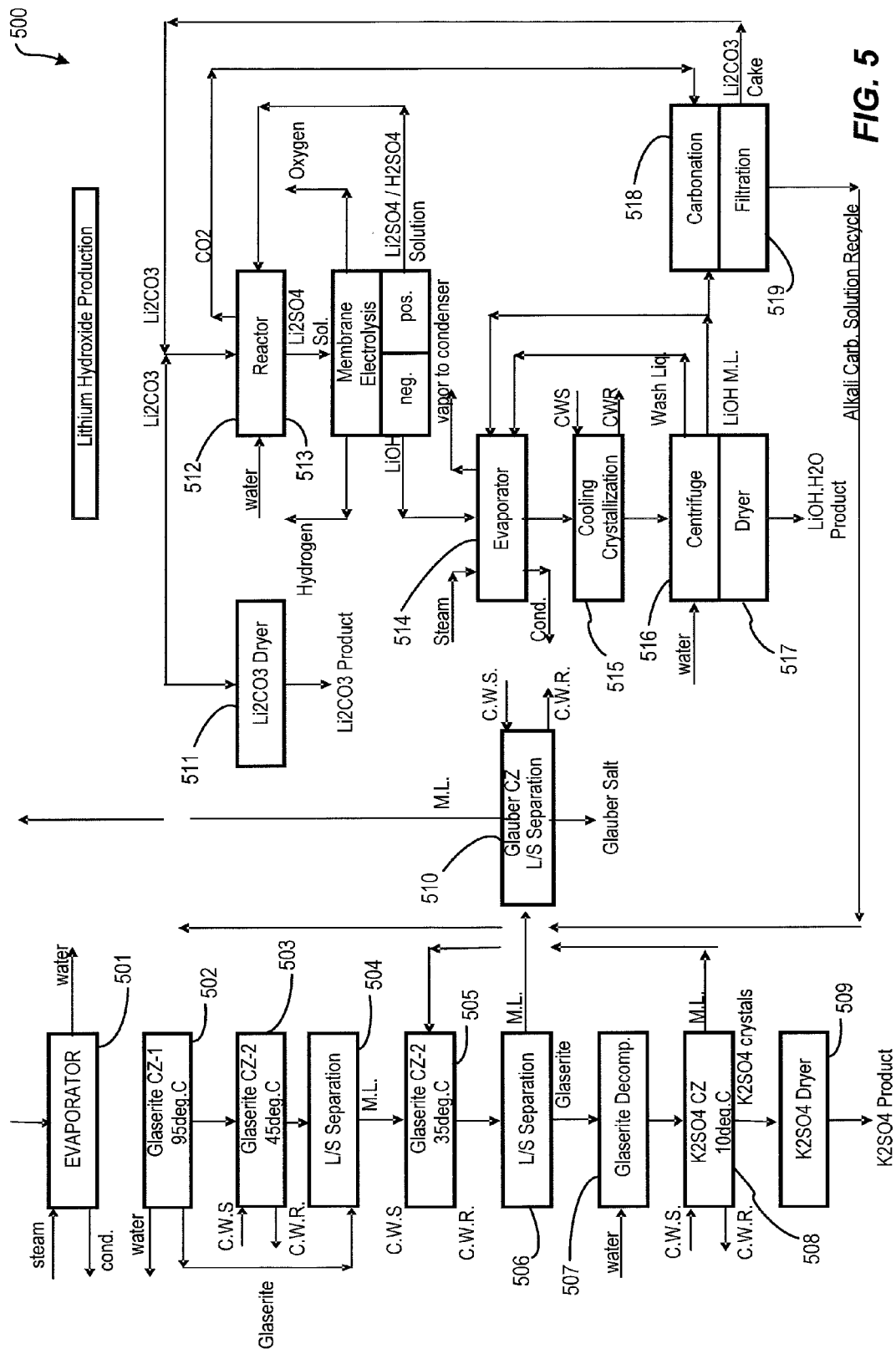
FIG. 5 is a schematic drawing of another continuous process for producing lithium carbonate, lithium hydroxide and potassium sulfate from a mineral source of lithium and potassium compositions in which lithium carbonate is extracted by crystallization and lithium hydroxide is extracted by membrane electrolysis.

FIG. 5 is a schematic drawing of another continuous process 500 for producing lithium carbonate, lithium hydroxide and potassium sulfate from a mineral source of lithium and potassium compositions in which lithium carbonate is extracted by crystallization and lithium hydroxide is extracted by membrane electrolysis. The evaporator is fed with a pregnant leach solution produced by calcining mineral bearing ore, hectorite being one such ore.

The pregnant leach solution from leach purification is concentrated by evaporation 501. Lithium carbonate is precipitated in precipitator 502 by adding sodium carbonate to the concentrated pregnant leach solution. Precipitator 502 produces lithium carbonate crystals and a lithium-barren mother liquor. The lithium carbonate crystals are dried in dryer 511 to form lithium carbonate product. Optionally, some or all of the lithium carbonate crystals may be introduced into reactor 512 as a first step in converting them to lithium hydroxide.

The mother liquor is acidified in acidification process 503 and conveyed to precipitator 504, where glaserite crystals are precipitated at 95° C., and then to precipitator 505, where glaserite crystals are precipitated at 35° C. Separator 506 separates the precipitated glaserite from the glaserite mother liquor produced in the two precipitations. The mother liquor is subjected to another crystallization process 510 in which glauber salt is precipitated. The mother liquor from this process is recycled to evaporator 501.

The glaserite obtained in crystallizations 504 and 505 is decomposed in process 507. This is followed by another crystallization 508 in which potassium sulfate crystals are deposited. These are treated in dryer 509 to form potassium sulfate product. The mother liquor from crystallization 508 is recycled to crystallizer 505.

When a lithium hydroxide product is desired, as noted, lithium carbonate crystals from precipitation 502 are introduced into reactor 512, where they are acidified and solubilized by treatment with the acidic anolyte from the membrane electrolyzer 513. The solution from reactor 512 is introduced into the membrane electrolyzer 513. The catholyte (neg.) is rich in lithium hydroxide. It is concentrated in evaporator 514, cooled and crystallized in process 515, separated from its mother liquor in centrifuge 516, and dried in dryer 517 to a lithium hydroxide product.

The mother liquor from centrifuge 516 is party recycled to evaporator 514 and partly carbonated with carbon dioxide from reactor 512 in carbonation process 518. This forms soluble lithium bicarbonate. Impurities are filtered out in filter 519, leaving solid lithium carbonate and an alkali carbonate recycle stream for insertion at the lithium carbonate precipitator 502. The solid lithium carbonate can be recycled back to reactor 512 for a further pass through the conversion circuit.

EXAMPLE 3

Figure 6:
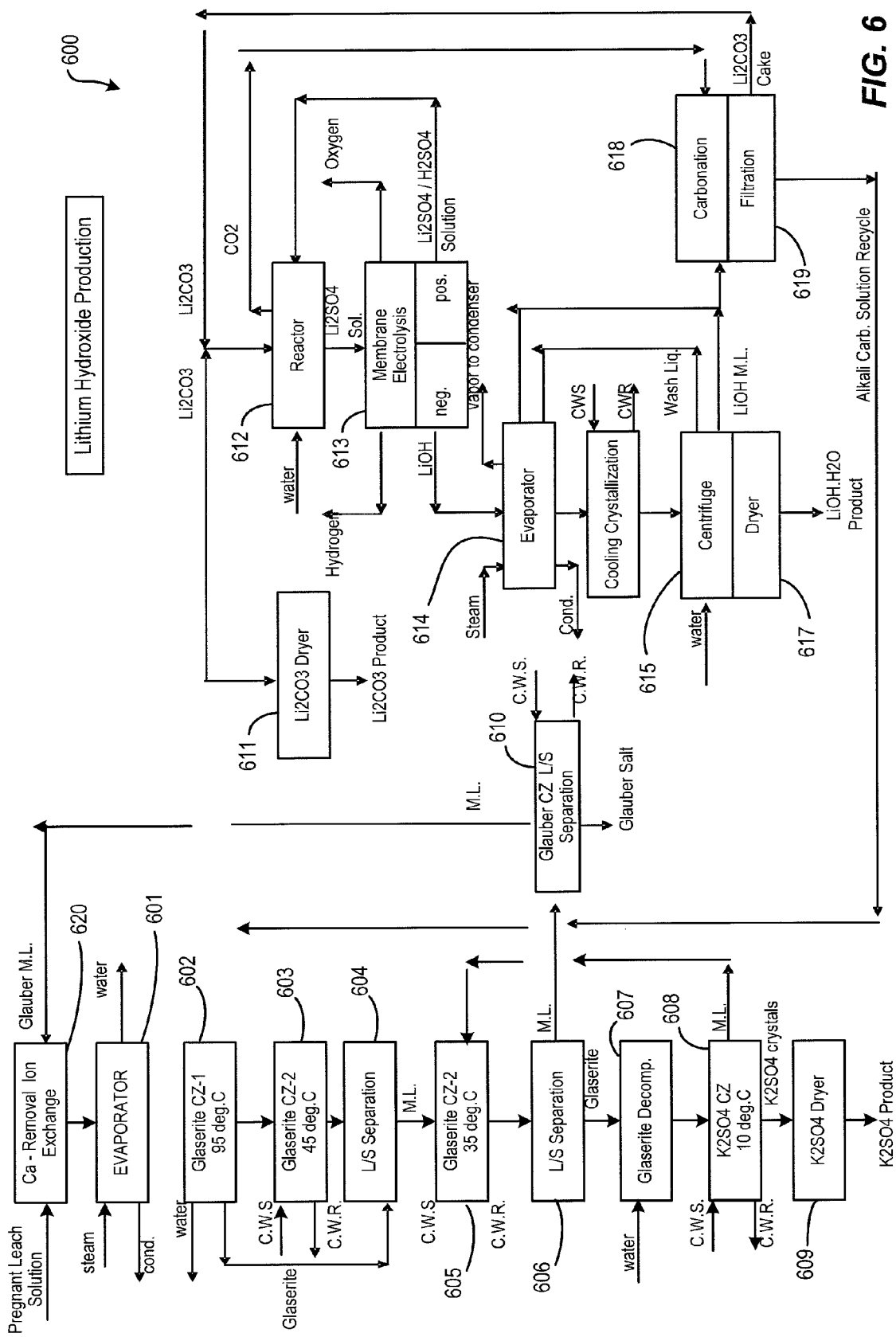
FIG. 6 is a schematic drawing of a continuous process 600 for producing, lithium hydroxide from lithium carbonate and potassium sulfate from a mineral source of potassium compositions.

FIG. 6 is a schematic drawing of a continuous process 600 for producing, lithium hydroxide from lithium carbonate and potassium sulfate from a mineral source of potassium compositions. The evaporator 601 is fed with a pregnant leach solution produced by calcining mineral bearing ore, hectorite being one such ore.

The pregnant leach solution from leach purification is purified in ion-exchange unit 620 before being concentrated by evaporator 601. The concentrate is conveyed to precipitator 602, where glaserite crystals are precipitated at 95° C., and then to precipitator 603, where glaserite crystals are precipitated at 45° C. Separator 604 separates the precipitated glaserite from the glaserite mother liquor produced in the two precipitations. This is followed by a third glaserite crystallization 605 at 35° C., and the glaserite is separated from the glaserite mother liquor by separator 606.

The glaserite mother liquor is subjected to another crystallization process 610 in which glauber salt is precipitated as a product. The mother liquor from this process 610 is recycled to evaporator 601. The glaserite obtained in crystallizations 602, 603 and 605 is decomposed in decomposition process 607. This is followed by another crystallization 608 in which potassium sulfate crystals are deposited. These are treated in dryer 609 to form potassium sulfate product. The mother liquor from crystallization 608 is recycled to glaserite crystallizer 605.

Lithium carbonate is introduced into reactor 612, where they are acidified and solubilized by treatment with the acidic anolyte from the membrane electrolyzer 613. The solution from reactor 612 is introduced into the membrane electrolyzer 613. The catholyte (neg.) is rich in lithium hydroxide. It is concentrated in evaporator 614, cooled and crystallized in process 615, separated from its mother liquor in centrifuge 616, and dried in dryer 617 to a lithium hydroxide product.

The mother liquor from centrifuge 616 is party recycled to evaporator 614 and partly carbonated with carbon dioxide from reactor 612 in carbonation process 618. This forms soluble lithium bicarbonate. Impurities are filtered out in filter 619, leaving solid lithium carbonate and an alkali carbonate recycle stream for insertion in the potassium sulfate circuit. The solid lithium carbonate can be recycled back to reactor 612 for a further pass through the conversion circuit.

EXAMPLE 4

Figure 7:
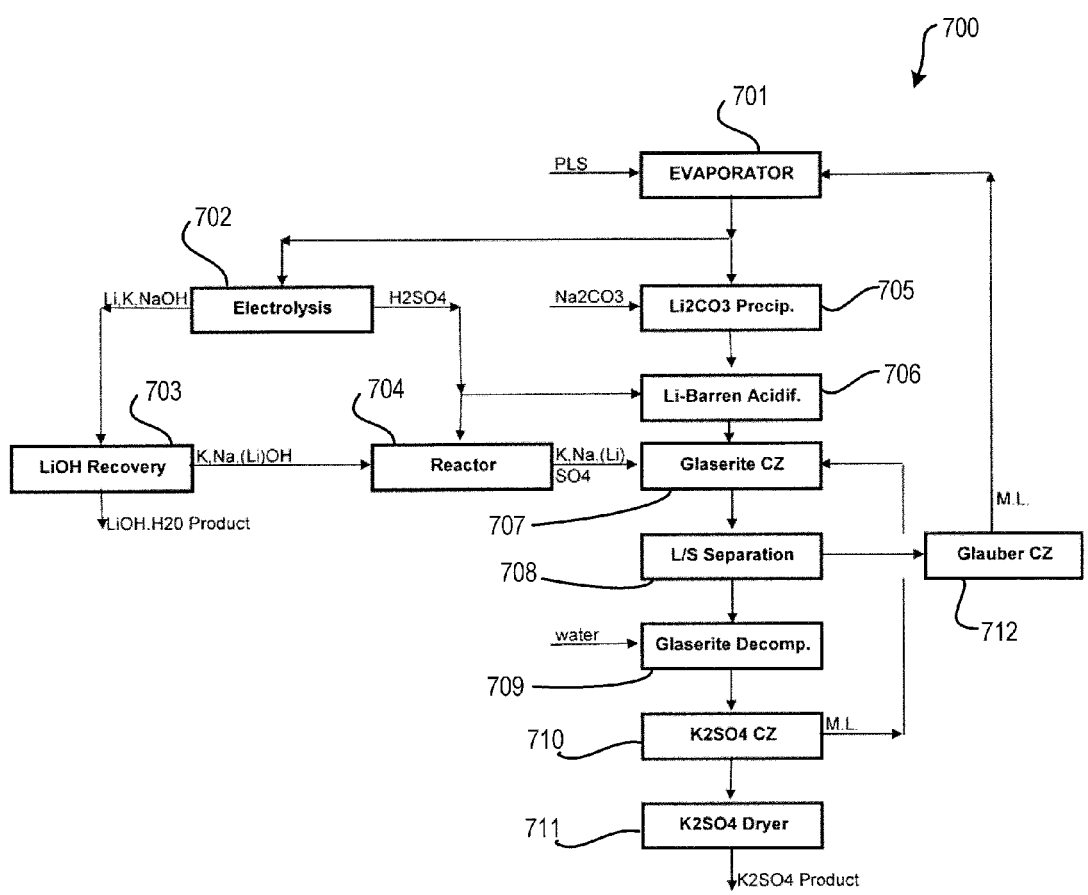
FIG. 7 is a schematic drawing of a further continuous process for producing lithium carbonate, lithium hydroxide and potassium sulfate from a mineral source of lithium and potassium compositions in which lithium carbonate is extracted by crystallization and lithium hydroxide is extracted by membrane electrolysis.

FIG. 7 is a schematic drawing of a continuous process 700 for producing lithium carbonate, lithium hydroxide and potassium sulfate from a mineral source of lithium and potassium compositions in which lithium carbonate is extracted by crystallization and lithium hydroxide is extracted by membrane electrolysis. The evaporator 701 is fed with a pregnant leach solution produced by calcining mineral bearing ore, hectorite being one such ore.

The pregnant leach solution from leach purification is concentrated by evaporation 701. Lithium carbonate is precipitated in precipitator 705 by adding sodium carbonate to the concentrated pregnant leach solution. Precipitator 705 produces lithium carbonate crystals and a lithium-barren mother liquor. The lithium carbonate crystals may be dried in to form lithium carbonate product.

The mother liquor is acidified in acidification process 706 and conveyed to precipitator 707, where glaserite crystals are precipitated. Separator 708 separates the precipitated glaserite from the glaserite mother liquor produced in precipitation 707. The mother liquor is subjected to another crystallization process 712 in which glauber salt is precipitated. The mother liquor from this process is recycled to evaporator 701.

The glaserite obtained in crystallization 707 is decomposed in process 709. This is followed by another crystallization 710 in which potassium sulfate crystals are deposited. These are treated in dryer 711 to form potassium sulfate product. The mother liquor from crystallization 710 is recycled to crystallizer 707.

Lithium hydroxide product is obtained by taking concentrated leach solution from evaporator 701 and processing it in membrane electrolyzer 702. The caustic catholyte is rich in lithium hydroxide, and lithium hydroxide product is produced in recovery unit 703. The caustic mother liquor from recovery unit 703 is rich in hydroxide compounds of lithium, potassium and sodium. These are converted to sulfates in reactor 704, where they are reacted with the acidic anolyte from membrane electrolyzer 702. These converted sulfates are recycled to glaserite crystallizer 707.

EXAMPLE 5

Figure 8:
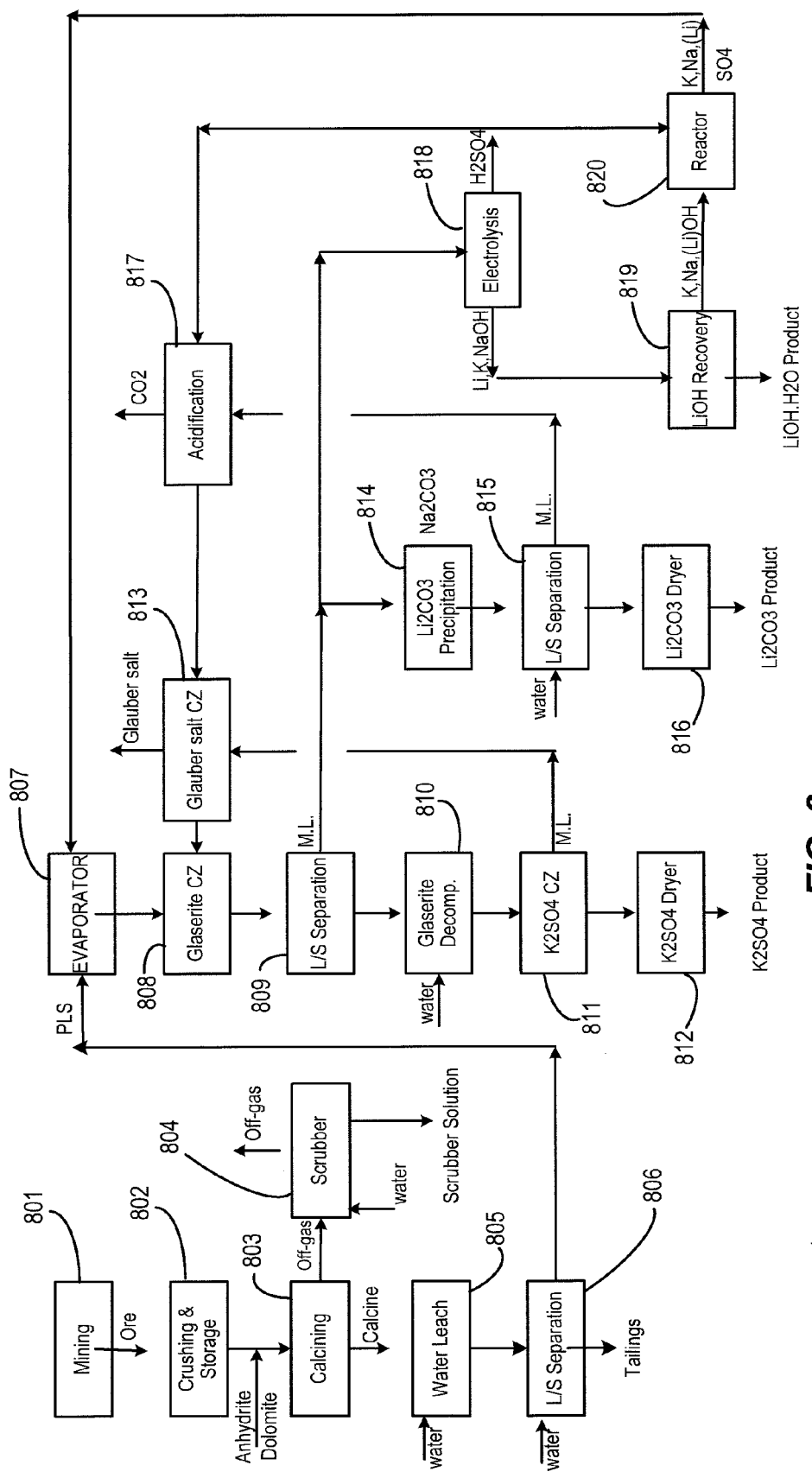
FIG. 8 is a schematic drawing of one more continuous process for producing lithium carbonate, lithium hydroxide and potassium sulfate from a mineral source of lithium and potassium compositions in which lithium carbonate is extracted by crystallization and lithium hydroxide is extracted by membrane electrolysis.

FIG. 8 is a schematic drawing of one more continuous process 800 for producing lithium carbonate, lithium hydroxide and potassium sulfate from a mineral source of lithium and potassium compositions in which lithium carbonate is extracted by crystallization and lithium hydroxide is extracted by membrane electrolysis.

Ore Crushing and Storage

Mined ore 801 bearing convertible lithium and potassium compounds is delivered from the mine by trucks and can be fed directly to the process or stored on the runoff-mine ore pad with capacity of 30 days of production. A front-end loader is provided for alternate means of ore delivery from ore pad to the process.

An impact crusher 802 operating in a closed circuit with a vibrating screen reduces ore size to ~12 mm, suitable for the downstream grinding operation. The fine ore is conveyed to a stock pile providing surge capacity between the crushing operation on 10 hours per day schedule and the downstream continuous operation. The crushed ore is advanced to the process by reclaim feeders and conveyors. The downstream plant is designed to process 5000 tons per day of the ore.

Calcining

Calcium sulfate (anhydrite) and dolomite reagents are required for the calcining process 803. They are crushed to ~12 mm size and stored in separate silos. In preparation for the calcining process 803, ore 801 and the reagents are ground and well mixed to facilitate reactions. Reagents and ore 801 are metered by weigh-belt feeders to a dry ball mill, operating in a closed circuit with cyclonic separator. The components are ground to ~150 micron and then are advanced to a pelletizer and dried in a fluid bed dryer, which is heated by a split stream of the hot off-gas from the downstream calciner. Dust generated in the ball mill and calciner circuits is collected in a baghouse filter and added to the pelletizer feed stream.

Calcine process 803 involves a conversion of lithium and other alkali metals contained in the ore 801 (hectorite clay) to water-soluble sulfates employing a high temperature (approximately 1000° C.) calciner. The ore 801 is mixed with dolomite and anhydrite minerals because this is necessary for the conversion process. The primary reaction is between lithium, potassium and sodium silicates present in the ore 801 and calcium sulfate (anhydrite), forming lithium, potassium and sodium sulfates and free silica ($SiO_2$). The dolomite prevents reverse reaction of alkali sulfates by bonding with free silica and forming calcium silicate. The advantage of this calcining process 803 is that the impurities in the ore 801 remain insoluble, thus simplifying downstream recovery and refining. The reported reaction kinetics are slow, thus requiring an extended (approximately 1 hour) residence time.

The hot calcine is cooled by ambient air in a fluidized bed cooler. To increase the thermal efficiency of the system, preheated air from the cooler is used as make-up air for the calciner 803. To further maximize the thermal efficiency of the system, remaining calciner off-gas is used in the waste heat boiler to produce steam required in the downstream lithium and potassium recovery processes. The calcine material is stored in a bin. This provides surge capacity between the calciner 803 and water-leach unit 805.

Leaching

The calcine material is leached with water at 95° C. for 30 minutes in leach unit 805. Operation at this elevated temperature maximizes concentration of potassium sulfate in solution, thus reducing energy costs in the downstream evaporation process. Lithium and potassium recoveries in the leach are 92% and 90% respectively.

The leach slurry is advanced to an automated filter press 806. Since the alkali sulfates are in the filtrate, the filter cake is washed and air-blown to maximize lithium and potassium recoveries and minimize the residual sulfate content of the tailings. Filtrate is stored in a holding tank, providing surge capacity between leach 805 and downstream processing. A polishing filter is provided on the filtrate stream to prevent any solid contaminant carryover.

Evaporation

The clarified filtrate from filter press 806 contains traces of calcium. This has to be removed as it would contaminate the lithium carbonate product and foul up the membrane in the electrolytic process. One means of removal is an ion exchange column located upstream of the evaporator 807.

Evaporator 807 receives filtrate from filter press 806 and a recycle stream from reactor 802 bearing potassium sulfate and sodium sulfate. Evaporator 807 increases concentration of these combined streams to near-saturation. The evaporator 807 is operating at elevated temperature to maximize concentration of potassium sulfate. As an added benefit, lithium concentration is increased, thus reducing the lithium load in the recycle stream. The evaporator 807 is heated by steam generated in the waste heat boiler. Concentrated sulfate solution is collected in a pregnant liquor tank, providing surge capacity between the evaporator 807 and downstream processes.

Sulfate Crystallization

Crystallization step 808 does not prepare potassium sulfate as a marketable product. Rather it prepares glaserite, an intermediate compound. The product of the crystallization is directed to separator 809, which separates glaserite crystals from the glaserite mother liquor. The glaserite crystals are decomposed in decomposition step 810 and the resulting product is fed to crystallizer 811, where potassium sulfate crystals are separated from a potassium-sulfate mother liquor rich in sodium sulfate. This mother liquor is subjected to a further crystallization step 813, which yields crystalline glauber salt (sodium sulfate deca-hydrate) and a glauber-salt mother liquor that is recycled back into the glaserite crystallizer 808.

An alternative to this process for recovering potassium sulfate would involve preparation of glaserite followed by crystallization to remove sodium sulfate as glauber salt. The glaserite would then be redissolved and a potassium chloride reagent added to convert the glaserite to potassium sulfate and sodium chloride. Crystallization of sodium chloride would be required to remove sodium from the circuit. The sodium chloride could be dried and marketed as a chemical product or deicing agent. Expanded production of potassium sulfate may be accomplished by converting the glauber salt with added potassium chloride.

Lithium Carbonate Recovery

Lithium carbonate is precipitated from a portion of the glaserite mother liquor resulting from separation process 809. This is accomplished by addition to the mother liquor of sodium carbonate, which is metered to lithium precipitation tanks 814. Lithium carbonate formed in the process is soluble in water and more soluble in the glaserite mother liquor. Because the solubility decreases with an increase in temperature, precipitation is conducted at 95° C. Precipitated lithium carbonate is separated in filter press 815 from a lithium mother liquor containing potassium sulfate and sodium sulfate, washed with hot water and dried in dryer 816. The lithium mother liquor is acidified in acidification process 817 and recycled to the sulfate crystallization circuit.

Lithium Hydroxide Recovery

The feed to the membrane electrolysis process 818 can be an alkali sulfate stream or a stream based on lithium carbonate product. In FIG. 8, feed for the electrolysis process 818 is provided from a portion of the glaserite mother liquor resulting from separation process 809, a process stream greatly depleted of potassium and sodium but containing a high concentration of lithium.

The membrane electrolysis process 818 converts alkali sulfates to their respective hydroxides on the cathode side. Similarly, it converts sulfates to sulfuric acid on the anode side. The electrolytic process 818 generates very pure hydrogen and oxygen streams. Hydrogen can be used as supplemental fuel in calcining or marketed as a pure product.

The catholyte is fed to a caustic evaporation/crystallization process 819. As the lithium hydroxide has significantly lower solubility than either sodium hydroxide or potassium hydroxide, it crystallizes out in the evaporation process as lithium hydroxide mono-hydrate and drops out further when the evaporator is cooled down. The lithium hydroxide is filtered and washed with a saturated aqueous solution of lithium hydroxide to remove entrained sodium and potassium. The washed product is dried and packaged under an inert atmosphere to avoid contact with carbon dioxide in air.

The mixed-hydroxide mother liquor from evaporator/crystallizer 819 is combined in reactor 820 with a portion of the anolyte from electrolyzer 818, which is highly acidic. This regenerates the corresponding alkali sulfates. The reaction liquor is recycled from reactor 820 to the sulfate crystallizer circuit to maximize recovery of potassium. The remainder of the anolyte is used to acidify lithium mother liquor in acidification process 817 to avoid precipitation of lithium carbonate in the sulfate crystallization circuit.

Tailings Disposal

There are two tailings streams generated by this process. The first tailings stream is leach residue, which contains 80% solids (inert calcined clay) and 20% residual moisture, mostly water with traces of potassium and sodium sulfates. This material is conveyed to tailings stockpiles located next to mined area. The second tailings stream is glauber salt slurry, basically sodium sulfate and water. This is deposited in a lined containment pond.

EXAMPLE 6

FIG. 9 is a schematic drawing of a continuous process 900 for producing lithium carbonate and potassium sulfate from a mineral source of lithium and potassium compositions in which lithium carbonate is extracted by crystallization. No electrolysis recovery method is used in this Example.

Ore Crushing and Storage

Mined ore bearing convertible lithium and potassium compounds is delivered from the mine by trucks and can be fed directly to the process or stored on the runoff-mine ore pad with capacity of 30 days of production. A front-end loader is provided for alternate means of ore delivery from ore pad to the process.

An impact crusher operating in a closed circuit with a vibrating screen reduces ore size to ~12 mm, suitable for the downstream grinding operation. The fine ore is conveyed to a stock pile providing surge capacity between the crushing operation on 10 hours per day schedule and the downstream continuous operation. The crushed ore is advanced to the process by reclaim feeders and conveyors. The downstream plant is designed to process 5000 tons per day of the ore.

Calcining

Calcium sulfate (anhydrite) and dolomite reagents are required for the calcining process. They are crushed to ~12 mm size and stored in separate silos. In preparation for the calcining process, the ore and the reagents are ground and well mixed to facilitate reactions. Reagents and ore are metered by weigh-belt feeders to a dry ball mill, operating in a closed circuit with cyclonic separator. The components are ground to ~150 micron and then are advanced to a pelletizer and dried in a fluid bed dryer, which is heated by a split stream of the hot off-gas from the downstream calciner. Dust generated in the ball mill and calciner circuits is collected in a baghouse filter and added to the pelletizer feed stream.

The calcine process involves a conversion of lithium and other alkali metals contained in the ore (hectorite clay) to water-soluble sulfates employing a high temperature (approximately 1000° C.) calciner. The ore is mixed with dolomite and anhydrite minerals because this is necessary for the conversion process. The primary reaction is between lithium, potassium and sodium silicates present in the ore and calcium sulfate (anhydrite), forming lithium, potassium and sodium sulfates and free silica ($SiO_2$). The dolomite prevents reverse reaction of alkali sulfates by bonding with free silica and forming calcium silicate. The advantage of this calcining process is that the impurities in the ore remain insoluble, thus simplifying downstream recovery and refining. The reported reaction kinetics are slow, thus requiring an extended (approximately 1 hour) residence time.

The hot calcine is cooled by ambient air in a fluidized bed cooler. To increase the thermal efficiency of the system, preheated air from the cooler is used as make-up air for the calciner. To further maximize the thermal efficiency of the system, remaining calciner off-gas is used in the waste heat boiler to produce steam required in the downstream lithium and potassium recovery processes. The calcine material is stored in a bin. This provides surge capacity between the calciner and water-leach unit 902.

Leaching

The calcine material is leached with water at 95° C. for 30 minutes in leach unit 902. Operation at this elevated temperature maximizes concentration of potassium sulfate in solution, thus reducing energy costs in the downstream evaporation process. Lithium and potassium recoveries in the leach are 92% and 90% respectively.

The leach slurry is advanced to an automated filter press. Since the alkali sulfates are in the filtrate, the filter cake is washed and air-blown to maximize lithium and potassium recoveries and minimize the residual sulfate content of the tailings. Filtrate is stored in a holding tank, providing surge capacity between leach 805 and downstream processing. A polishing filter is provided on the filtrate stream to prevent any solid contaminant carryover.

Evaporation

The clarified filtrate from the leach filter press contains traces of calcium. This has to be removed as it would contaminate the lithium carbonate product and foul up the membrane in the electrolytic process. One means of removal is an ion exchange column 904 located upstream of the evaporator 906. Another means of removal 904 is to remove the calcium by precipitation from the leach filtrate. Yet another means of removal 904 is to concentrate the filtrate by evaporation and then remove the calcium by precipitation.

Evaporator 906 receives filtrate from filter press and a recycle stream from separator 944 bearing potassium sulfate and sodium sulfate. Evaporator 906 increases concentration of these combined streams to near-saturation. The evaporator 906 is operating at elevated temperature to maximize concentration of potassium sulfate. As an added benefit, lithium concentration is increased, thus reducing the lithium load in the recycle stream. The evaporator 906 is heated by steam generated in the waste heat boiler. Concentrated sulfate solution is collected in a pregnant liquor tank, providing surge capacity between the evaporator 906 and downstream processes.

Sulfate Crystallization

Crystallization step 908 does not prepare potassium sulfate as a marketable product. Rather it prepares glaserite, an intermediate compound. The product of the crystallization is directed to separator 910, which separates glaserite crystals from the glaserite mother liquor. The glaserite crystals are decomposed in decomposition step 914 and the resulting product is fed to crystallizer 918, where potassium sulfate crystals are separated from a potassium-sulfate mother liquor rich in potassium sulfate and sodium sulfate. This mother liquor recycled back into evaporator 906.

An alternative to this process for recovering potassium sulfate would involve preparation of glaserite followed by crystallization to remove sodium sulfate as glauber salt. The glaserite would then be redissolved and a potassium chloride reagent added to convert the glaserite to potassium sulfate and sodium chloride. Crystallization of sodium chloride would be required to remove sodium from the circuit. The sodium chloride could be dried and marketed as a chemical product or deicing agent. Expanded production of potassium sulfate may be accomplished by converting the glauber salt with added potassium chloride.

Lithium Carbonate Recovery

Lithium carbonate is precipitated from the glaserite mother liquor resulting from separation process 910. This is accomplished by addition to the mother liquor of sodium carbonate, which is metered to lithium precipitation tanks 930. Lithium carbonate formed in the process is soluble in water and more soluble in the glaserite mother liquor. Because the solubility decreases with an increase in temperature, precipitation 930 is conducted at 95° C. Precipitated lithium carbonate is separated in filter press 932 from a lithium mother liquor containing potassium sulfate and sodium sulfate, washed with hot water and dried in dryer 936.

Glauber Salt Recovery

The lithium mother liquor from filter press 932 is acidified in acidification process 938 and directed to crystallization process 942, where glauber salt is precipitated in crystalline form. The glauber salt is separated from the glauber-salt mother liquor in separator 944, which is recycled to evaporator 906. The glauber salt is purified in purification process 948.

Tailings Disposal

There are two tailings streams generated by this process. The first tailings stream is leach residue, which contains 80% solids (inert calcined clay) and 20% residual moisture, mostly water with traces of potassium and sodium sulfates. This material is conveyed to tailings stockpiles located next to mined area. The second tailings stream is glauber salt slurry, basically sodium sulfate and water. This is deposited in a lined containment pond.

Figure 10:
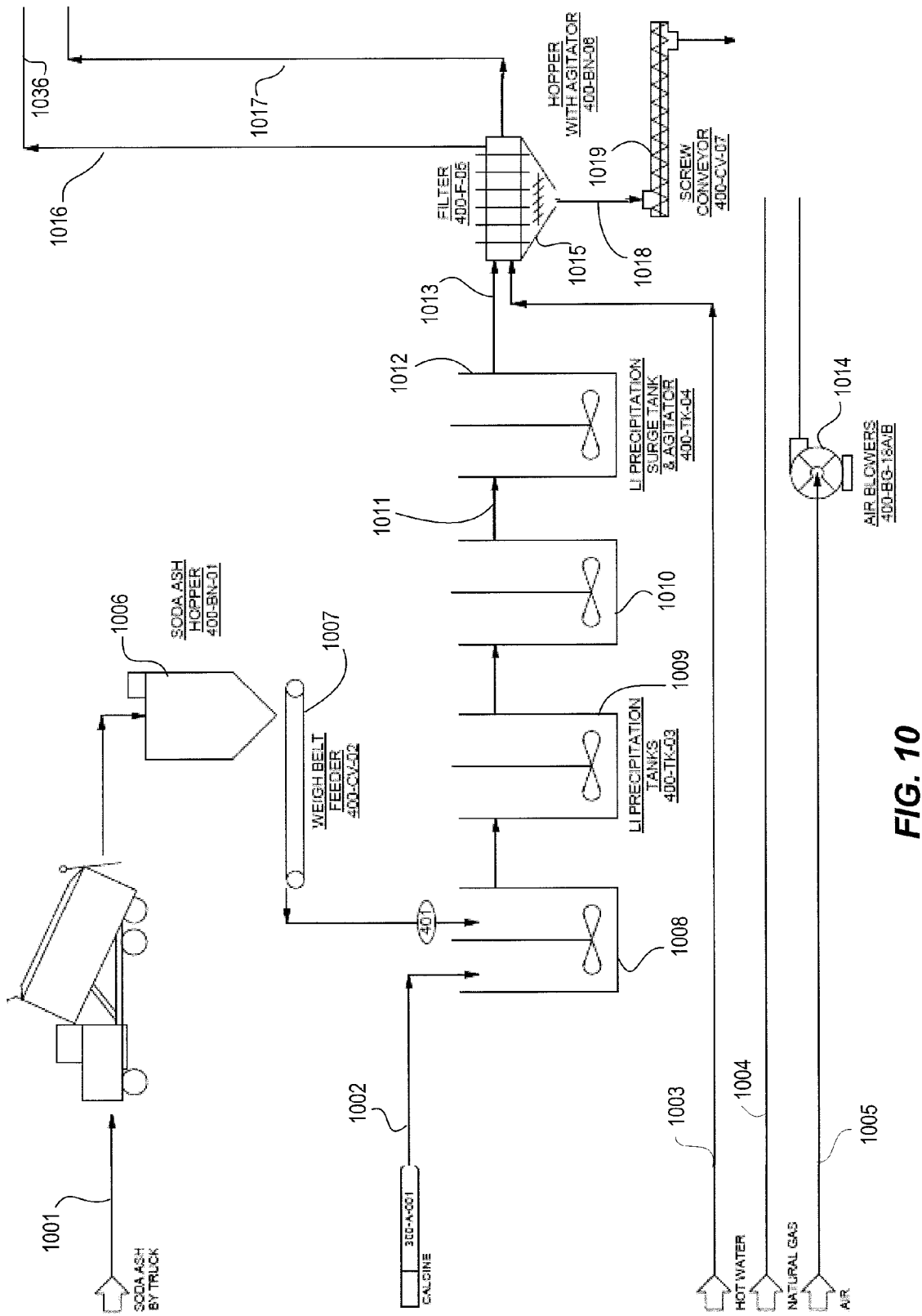
FIG. 10 is a detail drawing of a continuous process for extracting lithium carbonate by crystallization from the concentrated leach liquor of a continuous process for leaching lithium and potassium compositions from a calcined mineral source.
Figure 10:
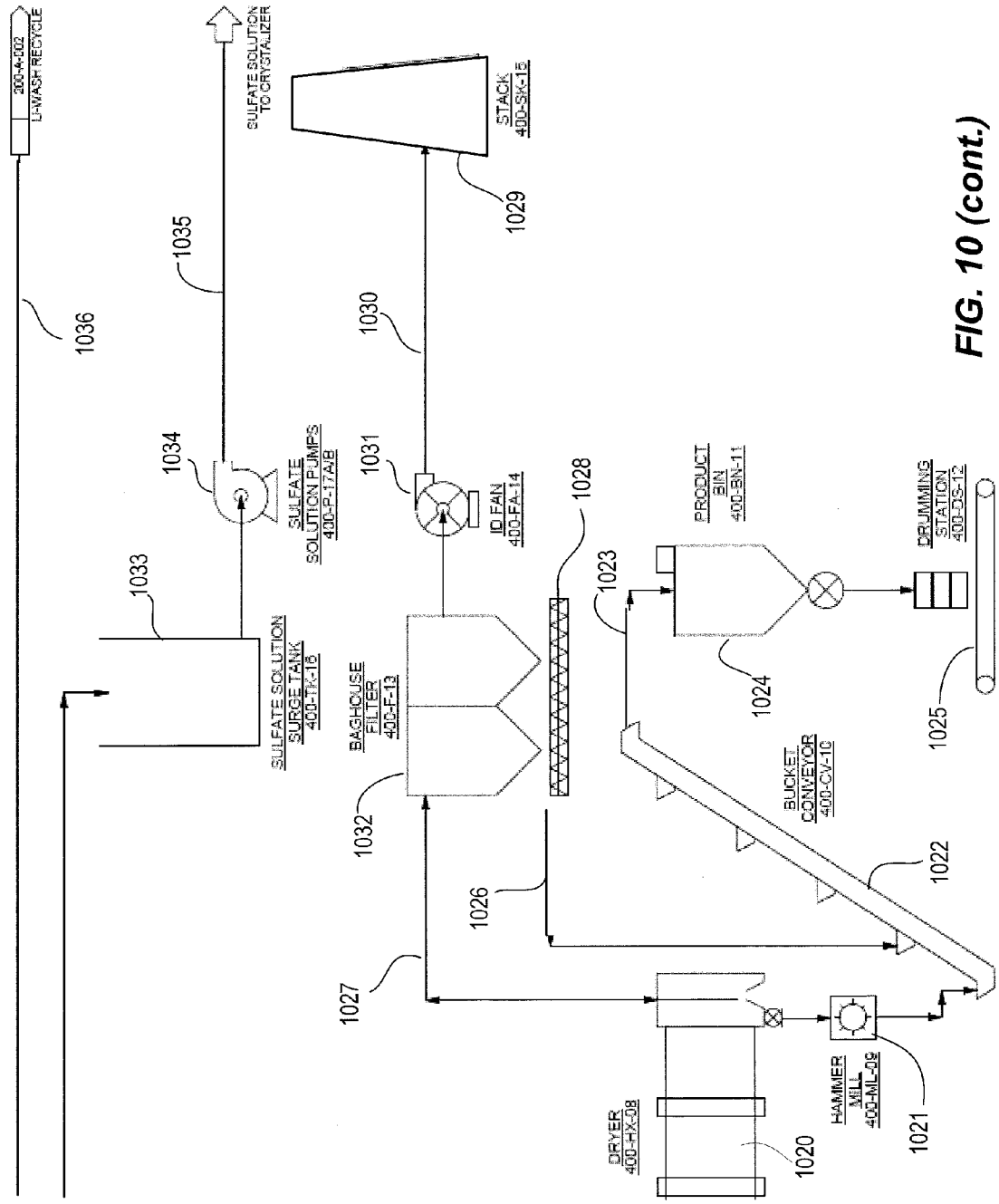

FIG. 10 is a detail drawing of a continuous process 1000 for extracting lithium carbonate by crystallization from the concentrated leach liquor of a continuous process for leaching lithium and potassium compositions from a calcined mineral source. Soda ash 1001 is deposited in soda ash hopper 1006. Weigh belt feeder 1007 meters soda ash 1001 into lithium precipitation tanks 1008-1010, which are filled with lithium feed 1002.

When precipitation is complete, lithium precipitation liquor 1011 is passed from lithium precipitation tank 1010 to lithium precipitation surge tank 1012, which is agitated. Lithium filter feed 1013 is taken from lithium precipitation surge tank 1012 and passed into filter 1015. The filtration process results in a lithium wash recycle 1016, a filter leachate 1017 and a lithium product 1018. The filter leachate 1017 is conveyed into a sulfate solution surge tank 1033, and from there is pumped to downstream processes.

Lithium product 1018 is deposited on screw conveyor 1019 and dropped into dryer 1020. Drying results in the production of lithium product and lithium fines 1027. The fines are collected in baghouse filter 1032. The very smallest fines 1030 are not collected and are conveyed for disposal to stack 1029 by ID fan 1031. The collected fines 1026 are dropped on conveyor 1028 and then on bucket conveyor 1022, which drops the fines 1026 into product bin 1024.

The lithium product from dryer 1020 is passed through hammer mill 1021. The milled lithium product is dropped onto bucket conveyor 1022, which drops the lithium product in turn into product bin 1024 along with fines 1026. Product bin 1024 feeds a drumming station 1025, where lithium product is loaded for distribution.

The following table sets forth information about the various process streams shown on FIG. 10:

| | | Stream No. | | | | | | | | |
|---|---|---|---|---|---|---|---|---|---|---|
| | | 1002 | 1037 | 1011 | 1013 | 1003 | 1017 | 1018 | 1023 | 1035 |
| | | | | | | Description | | | | |
| | | Filter Leachate | Soda Ash | Li Precip Liquor | Filter Feed | Hot water Wash | Filter Leachate | Li Product | Li Product to Bin | Sulfate Soln to Crystalization |
| Solids | tph | 0 | 3.42 | 2.90 | 2.90 | 0 | 0.00 | 2.90 | 2.90 | 0.00 |
| Liquid | tph | 129.9 | 0 | 130.5 | 130.45 | 17.53 | 129 | 1 | 0.73 | 129 |
| TOTAL | tph | 129.9 | 3.42 | 133.4 | 133.36 | 17.53 | 129 | 3.63 | 3.63 | 129 |
| | m³/h | 104.8 | | | | 17.53 | | | | |
| | % solids | 0 | 100 | 2.18 | 2.18 | 0 | 0 | 79.9 | 79.9 | 0 |
| | sp. gr | 1.24 | | | | 1.0 | | | | |
| Li | gpl, % | 7.13 | 0 | | | 0 | | | | |
| Li | kg/h | 747 | 0 | 747 | 747 | 0 | 162 | 545.4 | 545.4 | 162 |
| K | gpl, % | 96.9 | 0 | | | 0 | | 0 | 0 | |
| K | kg/h | 10159 | 0 | 10159 | 10159 | 0 | 9786 | 0 | 0 | 9788 |
| Na | kg/h | 5170 | 0 | 7044 | 7044 | 0 | 5892 | 0 | 0 | 5862 |
| Temp. | deg. C. | | | | | | | | | |

EXAMPLE 7

Figure 11:
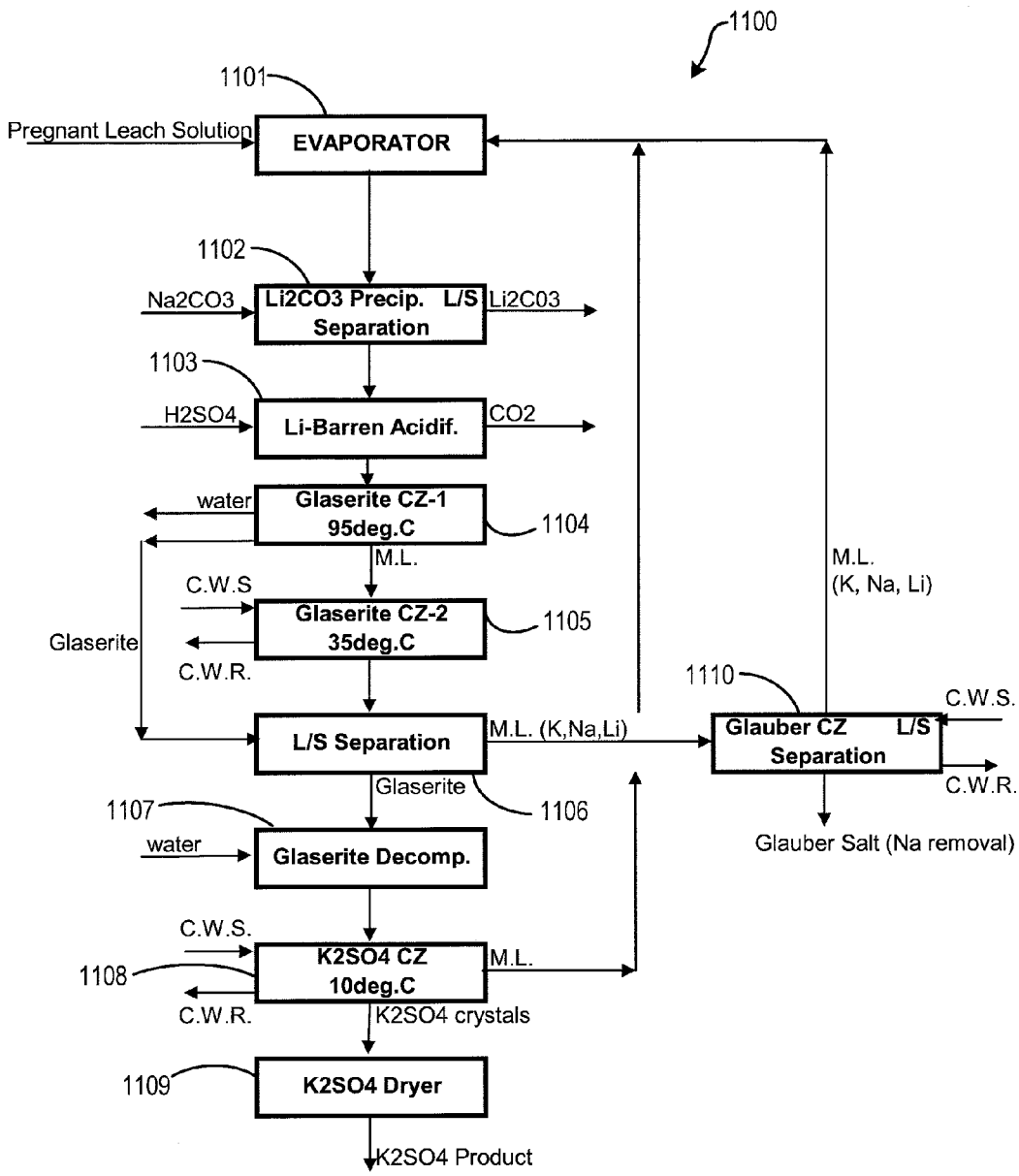
FIG. 11 is a schematic drawing of a continuous process for producing lithium carbonate and potassium sulfate from a mineral source of lithium and potassium compositions in which lithium carbonate is extracted by crystallization.

FIG. 11 is a schematic drawing of a continuous process 1100 for producing lithium carbonate and potassium sulfate from a mineral source of lithium and potassium compositions in which lithium carbonate is extracted by crystallization. No electrolysis recovery method is used in this Example. The evaporator 1101 is fed with a pregnant leach solution produced by calcining mineral bearing ore, hectorite being one such ore.

The pregnant leach solution from leach purification is concentrated by evaporation 1101. Lithium carbonate is precipitated in precipitator 1102 by adding sodium carbonate to the concentrated pregnant leach solution. Precipitator 1102 produces lithium carbonate crystals and a lithium-barren mother liquor. The lithium carbonate crystals are dried to form lithium carbonate product.

The mother liquor is acidified in acidification process 1103 and conveyed to precipitator 1104, where glaserite crystals are precipitated at 95° C., and then to precipitator 1105, where glaserite crystals are precipitated at 35° C. Separator 1106 separates the precipitated glaserite from the glaserite mother liquor produced in the two precipitations. The mother liquor is subjected to another crystallization process 1110 in which glauber salt is precipitated. The mother liquor from this process is recycled to evaporator 1101.

The glaserite obtained in crystallizations 1104 and 1105 is decomposed in process 1107. This is followed by another crystallization 1108 in which potassium sulfate crystals are deposited. These are treated in dryer 1109 to form potassium sulfate product. The mother liquor from crystallization 1108 is recycled to evaporator 1101.

EXAMPLE 8

Figure 12:
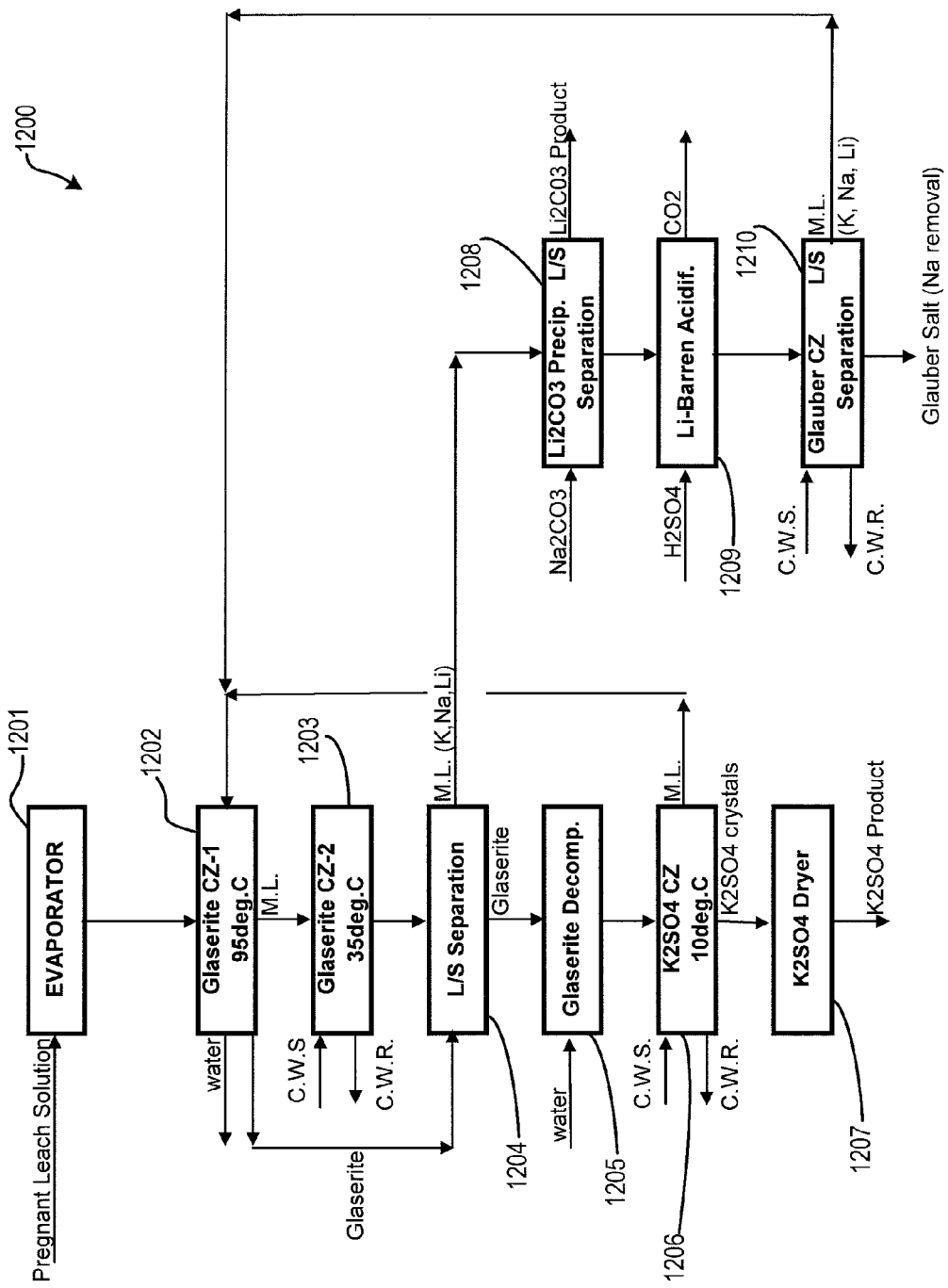
FIG. 12 is a schematic drawing of another continuous process for producing lithium carbonate and potassium sulfate from a mineral source of lithium and potassium compositions in which lithium carbonate is extracted by crystallization.

FIG. 12 is a schematic drawing of another continuous process 1200 for producing lithium carbonate and potassium sulfate from a mineral source of lithium and potassium compositions in which lithium carbonate is extracted by crystallization. No electrolysis recovery method is used in this Example. The evaporator 1201 is fed with a pregnant leach solution produced by calcining mineral bearing ore, hectorite being one such ore.

The pregnant leach solution from leach purification is concentrated by evaporation 1201 and conveyed to precipitator 1202, where glaserite crystals are precipitated at 95° C., and then to precipitator 1203, where glaserite crystals are precipitated at 35° C. Separator 1204 separates the precipitated glaserite from the glaserite mother liquor produced in the two precipitations. The glaserite obtained in crystallizations 1202 and 1203 is decomposed in process 1205. This is followed by another crystallization in precipitator 1206 in which potassium sulfate crystals are deposited. These are treated in dryer 1207 to form potassium sulfate product. The mother liquor from precipitator 1206 is recycled to precipitator 1202.

The mother liquor from separator 1204 is subjected to another crystallization in precipitator 1208 in which lithium carbonate is precipitated in by adding sodium carbonate to the mother liquor. Precipitator 1208 produces lithium carbonate crystals and a lithium-barren mother liquor, which is acidified in acidification process 1209 and then treated in precipitator 1210 to precipitate glauber salt. The mother liquor from precipitator 1210 is recycled to precipitator 1202.

EXAMPLE 9

Figure 13:
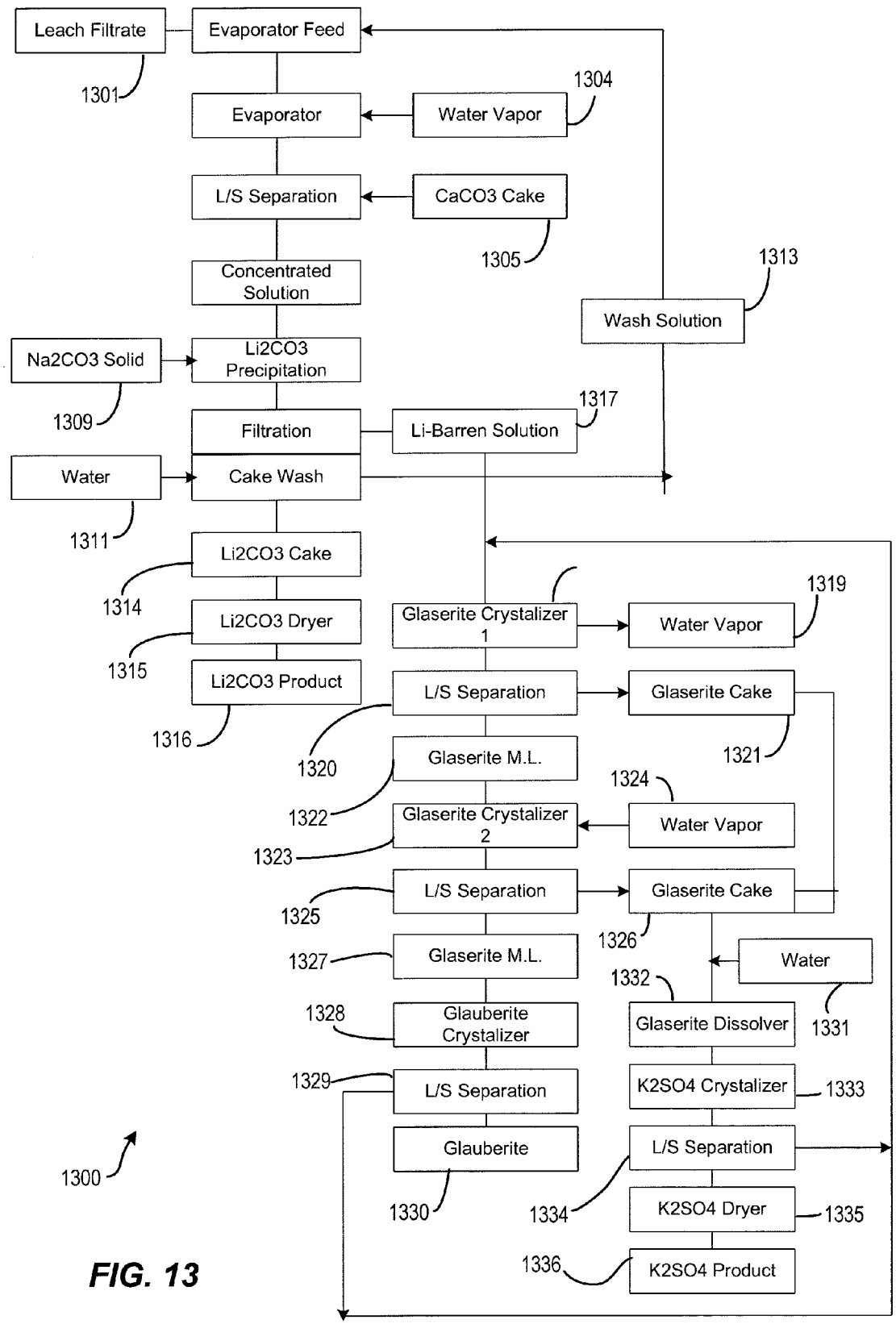
FIG. 13 is a schematic drawing of yet another continuous process for producing lithium carbonate and potassium sulfate from a mineral source of lithium and potassium compositions in which lithium carbonate is extracted by crystallization.

FIG. 13 is a schematic drawing of yet another continuous process 1300 for producing lithium carbonate and potassium sulfate from a mineral source of lithium and potassium compositions in which lithium carbonate is extracted by crystallization. No electrolysis recovery method is used in this Example. This drawing may be understood by reference to discussions of related processes in prior Examples, which use analogous process steps to arrive at the process as a whole.

EXAMPLE 10

Figure 14:
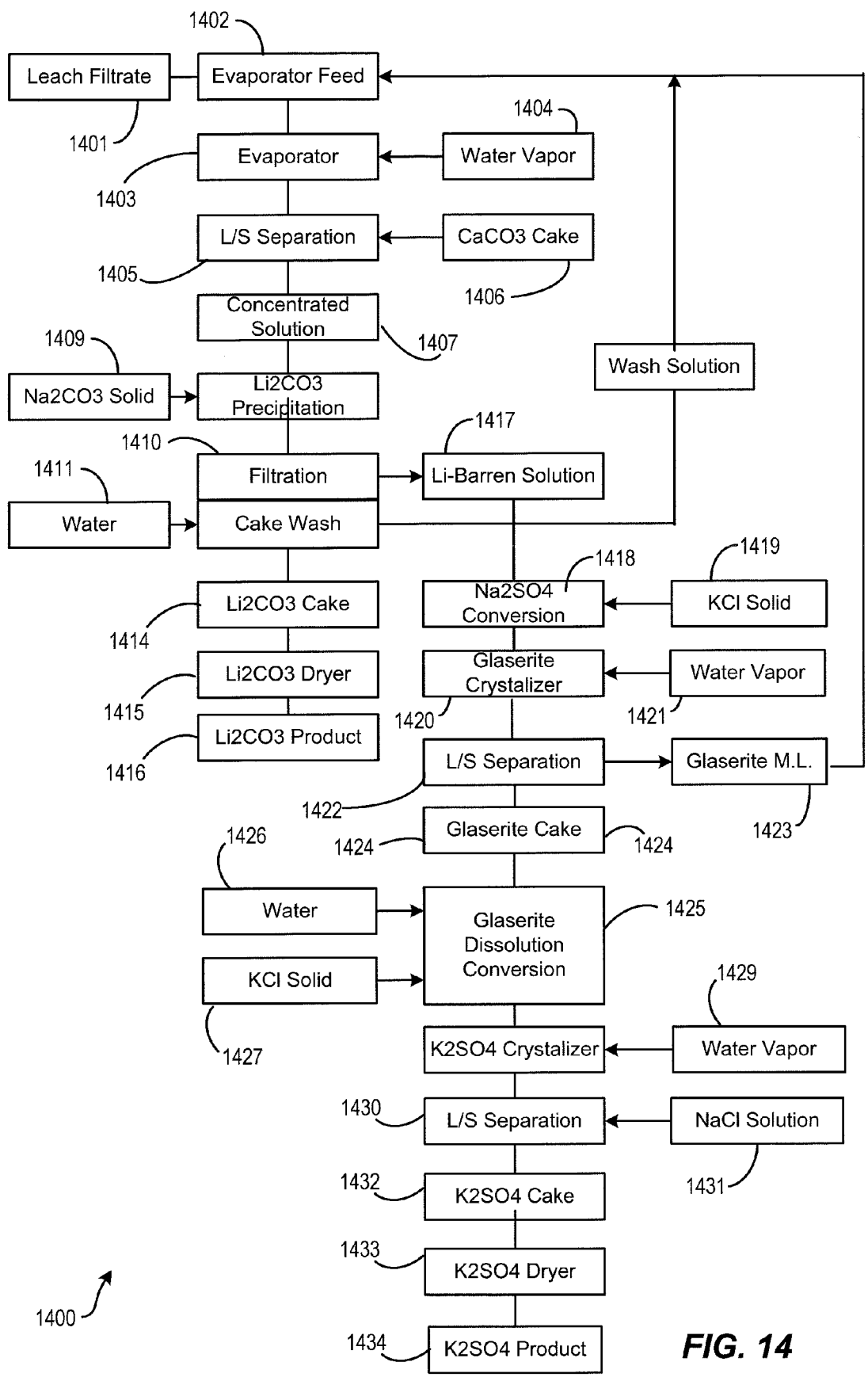
FIG. 14 is a schematic drawing of a further continuous process for producing lithium carbonate and potassium sulfate from a mineral source of lithium and potassium compositions in which lithium carbonate is extracted by crystallization.

FIG. 14 is a schematic drawing of a further continuous process 1400 for producing lithium carbonate and potassium sulfate from a mineral source of lithium and potassium compositions in which lithium carbonate is extracted by crystallization. No electrolysis recovery method is used in this Example. This drawing may be understood by reference to discussions of related processes in prior Examples, which use analogous process steps to arrive at the process as a whole.

What is claimed:
1. A method for recovering lithium, potassium and sodium compounds from a material containing a low concentration of lithium, which method comprises:
   (a) reducing the material to small particles having average diameter of about 150 microns or finer;
   (b) mixing the material with a solid source of sulfates and carbonates at ratios 0.1:1 to 0.9:1
   (c) granulating the mix with an aqueous solvent in order to obtain granules of 1-10 mm
   (d) heating the granules at temperatures of 950-1100 degrees C. to form reaction products
   (e) slurrying the reaction products of step (d) with process water;
   (f) heating the slurry of step (e) at about 50 degree. to 100 degree. C. for about between about 0.2 to 2 hr;
   (g) separating the solids and liquid of step (f);
   (h) evaporating the liquid of step (g) to from a concentrated solution having a volume of about 30 to 50% of original and cooling to 0 degree to 35 degree C.;
   (i) treating the concentrated solution from (h) to remove glaserite by filtering the cool suspension to leave a liquid phase;
   (j) reacting of a first part of the liquid phase of step (i) with a sufficient aqueous alkali carbonate to precipitate lithium carbonate to form a slurry and heating the slurry to between about 60 degree. to 125 degree. C. for between about 0.5 and 10 hr;
   (k) separating the hot slurry of step (j) to recover a liquid and the lithium value as solid lithium carbonate
   (l) decomposing the glaserite of step (i) to produce solid potassium sulfate
   (m) reacting the liquid of step (k) with sufficient amount acid to remove carbonates
   (n) treating the liquid of part (m) to remove glauber salt by cooling crystallization
   (o) recovering of lithium hydroxide from a second part of the liquid phase of step (i) by electrolysis.
2. The process of claim 1 wherein the material is a lithium-containing clay.
3. The process of claim 2 wherein in the clay, lithium is present in about 0.1 to 1 percent by weight.
4. The process of claim 2 wherein the clay is smectite.
5. The process of claim 1 wherein the lithium containing material is the clay hectoritic montmorillonite.
6. The process of claim 2 wherein the clay material, potassium is present in about 1 to 10 percent.
7. The process of claim 2 wherein the clay material, sodium is present in about 0.5 to 5 percent.

8. The process of claim 2 wherein the clay material, magnesium is present in about 1 to 15 percent.

9. The process of claim 2 wherein the clay material, aluminum and iron are present in about 1 to 5 percent each.

\* \* \* \* \*